(12) United States Patent
Sheikh et al.

(10) Patent No.: US 10,742,278 B2
(45) Date of Patent: Aug. 11, 2020

(54) LATTICE REDUCTION-AIDED SYMBOL DETECTION

(71) Applicant: Apple Inc., Cupertino, CA (US)

(72) Inventors: Farhana Sheikh, Portland, OR (US); Alexios Konstantinos Balatsoukas Stimming, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/763,860

(22) PCT Filed: Oct. 30, 2015

(86) PCT No.: PCT/US2015/058182
§ 371 (c)(1),
(2) Date: Mar. 28, 2018

(87) PCT Pub. No.: WO2017/074405
PCT Pub. Date: May 4, 2017

(65) Prior Publication Data
US 2018/0287675 A1    Oct. 4, 2018

(51) Int. Cl.
*H04B 7/0456* (2017.01)
*H04B 7/0413* (2017.01)
(Continued)

(52) U.S. Cl.
CPC ......... *H04B 7/0456* (2013.01); *H04B 7/0413* (2013.01); *H04B 7/0854* (2013.01); *H04L 27/2626* (2013.01)

(58) Field of Classification Search
CPC .. H04B 7/0413; H04B 7/0617; H04B 17/318; H04B 7/0456; H04B 1/40; H04B 7/0634; H04B 7/0854; H04B 7/086
(Continued)

(56) References Cited

U.S. PATENT DOCUMENTS

2005/0237920 A1* 10/2005 Howard ............... H04B 7/0413
370/208
2009/0252242 A1  10/2009 Kim et al.
(Continued)

FOREIGN PATENT DOCUMENTS

JP    2011211486 A    10/2011
KR    1020100085884 A    7/2010

OTHER PUBLICATIONS

International Search Report based on application No. PCT/US2015/058182 (5 pages) dated Jul. 26, 2016 (Reference Purpose Only).
(Continued)

*Primary Examiner* — David C Payne
*Assistant Examiner* — Sarah Hassan
(74) *Attorney, Agent, or Firm* — Kowert, Hood, Munyon, Rankin & Goetzel, P.C.

(57) ABSTRACT

An orthogonalization matrix calculation circuit may include a scaling coefficient calculation circuit configured to calculate a scaling coefficient for each of a plurality of candidate update operations for the orthogonalization matrix, wherein each of the plurality of candidate update operations comprises combining linearly at least one of a first column or a second column of the orthogonalization matrix previously utilized to update the orthogonalization matrix, an update operation selection circuit configured to select an optimum candidate update operation from the plurality of candidate update operations, and a matrix update circuit configured to update the orthogonalization matrix according to the scaling coefficient of the optimum candidate update operation.

23 Claims, 8 Drawing Sheets

(51) Int. Cl.
    *H04B 7/08*         (2006.01)
    *H04L 27/26*      (2006.01)

(58) Field of Classification Search
    USPC .......................................... 375/343; 327/159
    See application file for complete search history.

(56) References Cited

U.S. PATENT DOCUMENTS

| | | | |
|---|---|---|---|
| 2009/0262852 A1* | 10/2009 | Orlik | H04L 1/0606 375/267 |
| 2010/0183089 A1 | 7/2010 | Vasil'evich et al. | |
| 2012/0159122 A1 | 6/2012 | Anderson et al. | |
| 2012/0183088 A1 | 7/2012 | Liao et al. | |
| 2012/0236968 A1* | 9/2012 | Zhou | H04L 25/0244 375/316 |
| 2012/0263261 A1 | 10/2012 | Gestner et al. | |
| 2013/0243068 A1 | 9/2013 | Aubert | |

OTHER PUBLICATIONS

Gestner et al., "Lattice Reduction for MIMO Detection: From Theoretical Analysis to Hardware Realization", IEEE Transactions on Circuits and Systems—I: Regular Papers, Apr. 2011, pp. 813-826; vol. 58, No. 4.

Shabany et al., "High-Throughput 0.13-μm CMOS Lattice Reduction Core Supporting 880 Mb/s Detection", IEEE Transactions on Very Large Scale Integration (VLSI) Systems, May 2013, pp. 848-861, vol. 21, No. 5.

Ahmad et al., "Exploration of Lattice Reduction Aided Soft-Output MIMO Detection on a DLP/ILP Baseband Processor", IEEE Transactions on Signal Processing, Dec. 2013, pp. 5878-5892, vol. 61, No. 1 5.

Senning et al., "A Lattice Reduction-Aided MIMO Channel Equalizer in 90 nm CMOS Achieving 720 Mb/s", IEEE Transactions on Circuits and Systems—I: Regular Papers, Jun. 2014, pp. 1860-1871, vol. 61, No. 6.

Liao et al., "A 3.1 Gb/s 8×8 Sorting Reduced K-Best Detector With Lattice Reduction and QR Decomposition", IEEE Transactions on Very Large Scale Integration (VLSI) Systems, Dec. 2014, pp. 2675-2688, vol. 22, No. 12.

Liao et al., "Loop-Reduction LLL Algorithm and Architecture for Lattice-Reduction-Aided MIMO Detection", Journal of Electrical and Computer Engineering, 2012, 7 pages , vol. 2012.

Gan et al., "Complex Lattice Reduction Algorithm for Low-Complexity MIMO Detection", IEEE Transactions on Wireless Communication, 2006, 9 pages.

Yao et al., "Lattice-Reduction-Aided Detectors for MIMO Communication Systems", IEEE Global Telecommunications Conference, 2002, pp. 424-428.

Windpassinger et al., "Low-Complexity Near-Maximum-Likelihood Detection and Precoding for MIMO Systems using Lattice Reduction", IEEE Information Theory Workshop, 2003, pp. 345-348.

Wübben et al., "Near-Maximum-Likelihood Detection of MIMO Systems using MMSE-Based Lattice-Reduction", IEEE International Conference on Communications (GLOBECOM), 2004, pp. 798-802.

Milliner et al., "A Lattice-Reduction-Aided Soft Detector for Multiple-Input Multiple-Output Channels", IEEE Global Telecommunications Conference (GLOBECOM), 2006, 5 pages.

Ponnampalam et al., "On Generating Soft Outputs for Lattice-Reduction-Aided MIMO Detection", IEEE International Conference on Communications, 2007, pp. 4144-4149.

Taherzadeh et al., "LLL Reduction Achieves the Receive Diversity in MIMO Decoding", IEEE Transactions on Information Theory, Dec. 2007, pp. 4801-4805, vol. 53, No. 12.

Ling et al., "Effective LLL Reduction for Lattice Decoding", IEEE International Symposium on Information Theory, 2007, pp. 196-200.

Zhang et al., "Low-Complexity Soft-Output Decoding with Lattice-Reduction-Aided Detectors", IEEE Transactions on Communications, Sep. 2010, pp. 2621-2629, vol. 58, No. 9.

Shahabuddin et al., "A Customized Lattice Reduction Multiprocessor for MIMO Detection", IEEE International Symposium on Circuits and Systems (ISCAS), 2015, 4 pages.

Seethaler et al., "Low-Complexity MIMO Data Detection Using Seysen's Lattice Reduction Algorithm", IEEE International Conference on Acoustics, Speech and Signal Processing, 2007, pp. III-53-III-56.

Sandell et al., "Complexity study of lattice reduction for MIMO detection", IEEE Wireless Communications and Networking Conference, 2007, pp. 1089-1093.

Burg et al., "VLSI Implementation of a Lattice-Reduction Algorithm for Multi-Antenna Broadcast Precoding", IEEE International Symposium on Circuits and Systems, 2007, pp. 673-676.

Barbero et al., "A Comparison of Complex Lattice Reduction Algorithms for MIMO Detection", IEEE International Conference on Accoustics, Speech & Processing, 2008, pp. 2705-2708.

Wu et al., "A Programmable Lattice-Reduction Aided Detector for MIMO-OFDMA", 4th IEEE International Conference on Circuits and Systems for Communications, 2008, pp. 293-297.

Gestner et al., "VLSI Implementation of a Lattice Reduction Algorithm for Low-Complexity Equalization", 4th IEEE International Conference on Circuits and Systems for Communications, 2008, pp. 643-647.

Gestner et al., "VLSI Implementation of an Effective Lattice Reduction Algorithm With Fixedpoint Considerations", IEEE International Conference on Acoustics, Speech and Signal Processing, 2009, pp. 577-580.

Barbero et al., "Rapid Prototyping of Clarkson's Lattice Reduction for MIMO Detection", IEEE Communications Society subject matter experts for publication in the IEEE ICC, 2009, 5 pages.

Bruderer et al., "VLSI Implementation of a Low-Complexity LLL Lattice Reduction Algorithm for MIMO Detection", IEEE International Symposium on Circuits and Systems, 2010, pp. 3745-3748.

Youssef et al., "VLSI Implementation of a Hardware-Optimized Lattice Reduction Algorithm for WiMAX/LTE MIMO Detection", IEEE International Symposium on Circuits and Systems, 2010, pp. 3541-3544.

Zhang et al., "Designing Low-Complexity Detectors Based on Seysen's Algorithm", IEEE Transactions on Wireless Communications, Oct. 2010, pp. 3301-3311, vol. 9, No. 10 29.

Liao et al., "Power-Saying 4×4 Lattice-Reduction Processor for MIMO Detection With Redundancy Checking", IEEE Transactions on Circuits and Systems—II: Express Briefs, Feb. 2011, pp. 95-99, vol. 58, No. 2.

Najafi et al., "On Adaptive Lattice Reduction over Correlated Fading Channels", IEEE Transactions on Communications, May 2011, pp. 1224-1227,vol. 59, No. 5.

Bruderer et al., "Low-Complexity Seysen's Algorithm based Lattice Reduction-Aided MIMO Detection for Hardware Implementations", IEEE, 2010, pp. 1468-1472.

Liao et al., "Multi-Stage Lattice-Reduction-Aided MIMO Detector Using Reverse-Order LLL Algorithm", IEEE Asia Pacific Conference on Circuits and Systems (APCCAS), 2010, pp. 100-103.

Le et al., "Combined Adaptive Lattice Reduction-Aided Detection and Antenna Shuffling for DSTTD-OFDM Systems", IEEE 14th Workshop on Signal Processing Advances in Wireless Communications, 2013, pp. 100-104.

Liao et al., "A 0.18nJ/Matrix QR Decomposition and Lattice Reduction Processor for 8×8 MIMO Preprocessing", IEEE Asian Solid-State Circuits Conference (A-SSCC), 2013, pp. 161-164.

Sheikh et al., "Channel-Adaptive Complex K-Best MIMO Detection Using Lattice Reduction", 6 pages.

Ahmad et al., "Hybrid Lattice Reduction Algorithm and Its Implementation on an SDR Baseband Processor for LTE", 19th European Signal Processing Conference (EUSIPCO), 2011, pp. 91-95.

Youssef et al., "Performance Analysis of Lattice-Reduction Algorithms for a Novel LR-Compatible K-Best MIMO Detector", IEEE International Symposium o Circuits and Systems (ISCAS), 2011, pp. 701-704.

(56) References Cited

OTHER PUBLICATIONS

Lenstra et al., "Factoring Polynomials with Rational Coefficients", Math. Ann., 1982, pp. 515-534, vol. 261, No. 4.
Seysen, "Simultaneous Reduction of a Lattice Basis and Its Reciprocal Basis", Combinatorica, 1993, pp. 363-376, vol. 13, No. 3.
Wubben et al., "Lattice Reduction": IEEE Signal Processing Magazine, May 2011, pp. 70-91, vol. 28, No. 3, Piscataway, NJ, US.
European Office Action dated Apr. 2, 2019 and Supplementary European Search Report of EP Patent application No. EP15907500, dated Mar. 19, 2019, 6 pages (for reference purpose only).

* cited by examiner

US 10,742,278 B2

LATTICE REDUCTION-AIDED SYMBOL DETECTION

RELATED APPLICATIONS

The present application is a national stage entry according to 35 U.S.C. § 371 of PCT application No.: PCT/US2015/058182 filed on Oct. 30, 2015 and is incorporated herein by reference in its entirety.

TECHNICAL FIELD

Various embodiments relate generally to orthogonalization matrix calculation circuits and methods for performing MIMO symbol detection.

BACKGROUND

Multiple-input and multiple output (MIMO) systems may apply multiple antennas at both the transmitter and the receiver in order to increase spectral efficiency. MIMO technology has been embraced by several recent wireless communications standards, including Institute of Electrical and Electronics Engineers (IEEE) 802.11ac (WiFi) and $3^{rd}$ Generation Partnership Project (3GPP) Long Term Evolution (4G), where relatively small arrays of up to four antennas are used. MIMO is expected to continue to play a major role in emerging 5G systems, where it may be employed on a much more massive scale.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
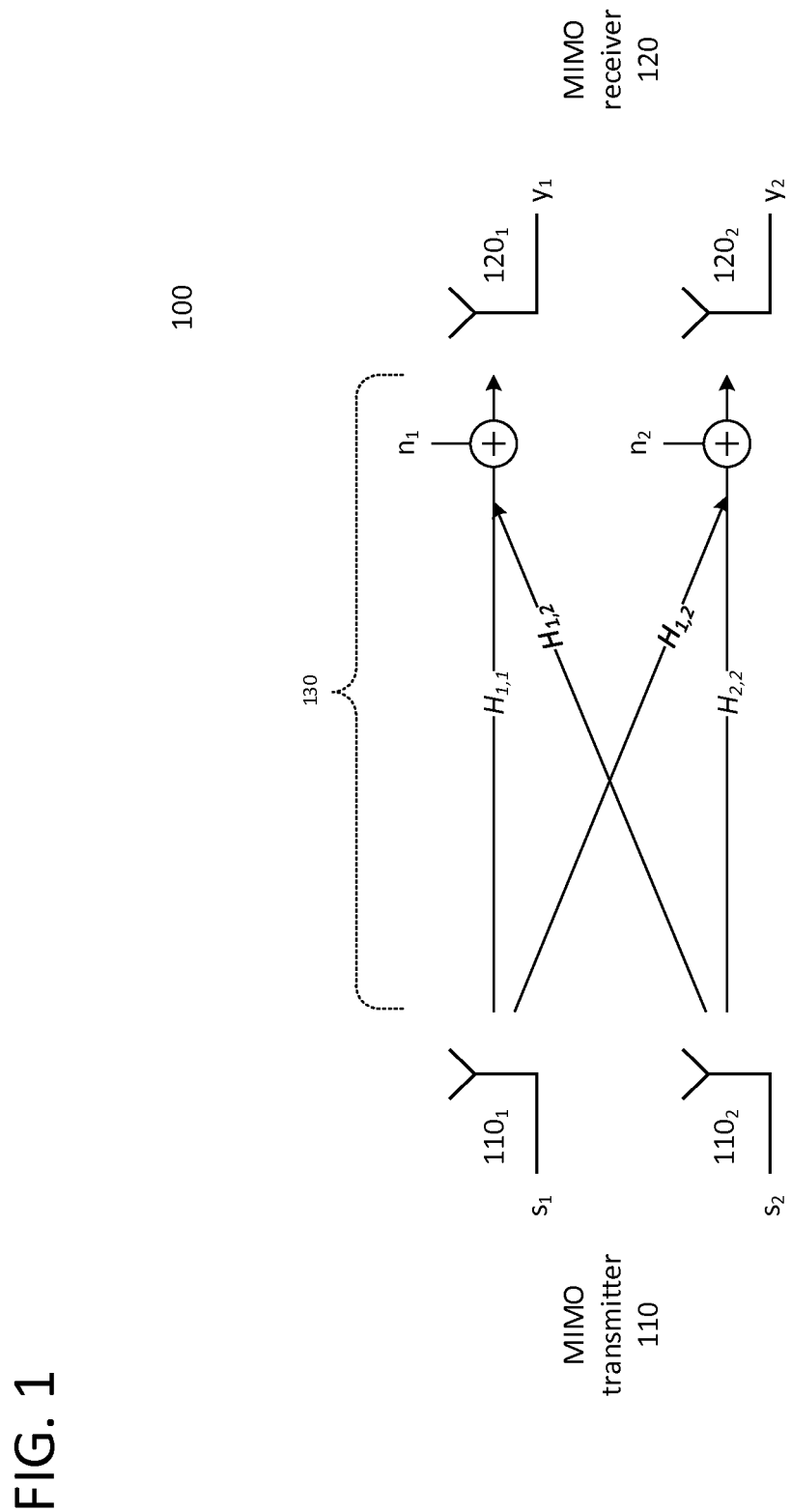
FIG. 1 shows a simplified MIMO receiver-transmitter system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

As used herein, a "circuit" may be understood as any kind of logic implementing entity (analog or digital), which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. Accordingly it is understood that references to a "circuit" may refer to two or more circuits that collectively form a single circuit.

A "processing circuit" (or equivalently "processing circuitry") as used herein is understood as referring to any circuit that performs an operation on a signal or signals, such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, it is appreciated that while memory may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced (LTE-A), CDMA, WCDMA, LTE-A, General Packet Radio Service (GPRS), Enhanced Data Rates for GSM Evolution (EDGE), High Speed Packet Access (HSPA), HSPA Plus (HSPA+), and other similar radio communication technologies.

The term "RAT system" as utilized herein refers to the hardware, software, and/or firmware components of a mobile device that support operation of at least one Radio Access Technology (RAT). A RAT system may thus include one or more microprocessors/microcontrollers and/or one or more processing circuits, where the one or more microprocessors/microcontrollers may be configured to execute program code for software and/or firmware modules to control the microprocessor/microcontrollers to operate in accordance with the protocol stack (Layer 2 and 3) and/or physical layers (Layer 1) of a particular radio access technology. The microprocessors/microcontrollers may be configured to control the one or more processing circuits and any additional components in accordance with control logic provided by the software/firmware modules defined in the program code. It is appreciated that the RAT systems for multiple RATs may be integrated, such as in the case of a multi-mode baseband modem configured to support operation of more than one RAT. Accordingly, one or more microprocessors/microcontrollers, processing circuits, and/or software/firmware modules may be shared between multiple RAT systems. Such may include unified protocol stacks (Layers 2 and 3) and/or unified physical layers (Layer 1). A multi-mode RAT system may thus refer to one or more microprocessors/microcontrollers and one or more processing circuits that cooperatively support multiple RATs, such as in accordance with master and slave RAT roles; however it is appreciated that the term "RAT system" encompasses both single- and multi-mode RAT systems. A RAT system configured for a specific radio access technology may be denoted as e.g. an LTE system, a UMTS system, a GSM system, a Bluetooth system, a WiFi system, etc. A baseband modem may be referred to as a RAT system; however it is appreciated that a multi-mode baseband modem may be composed of multiple RAT systems, e.g. at least one RAT system for each radio access technology supported by the baseband modem, where each RAT system in a multi-mode baseband modem may be discrete or integrated relative to the other RAT systems.

The term "network" as utilized herein, e.g. in reference to a communication network such as a mobile communication network, is intended to encompass both an access section of a network (e.g. a radio access network (RAN) section) and a core section of a network (e.g. a core network section).

As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct and indirect transmission. Similarly, the term "receive" encompasses both direct and indirect reception unless explicitly specified.

Multiple-Input Multiple-Output (MIMO) systems may increase spectral efficiency by utilizing multiple transmit antennas and multiple receive antennas. In a MIMO system, each transmit antenna may transmit a separate symbol using a shared time-frequency resource (e.g. using the same subcarrier and symbol interval). Each receive antenna may then produce a separate received symbol, where each received symbol contains contributions of each symbol transmitted by each transmit antenna. MIMO receivers may recover each transmitted symbol by performing MIMO detection, which may rely on spatial diversity of the transmit antennas in order to uniquely recover each transmitted symbol from the corresponding received symbols.

Figure 2:
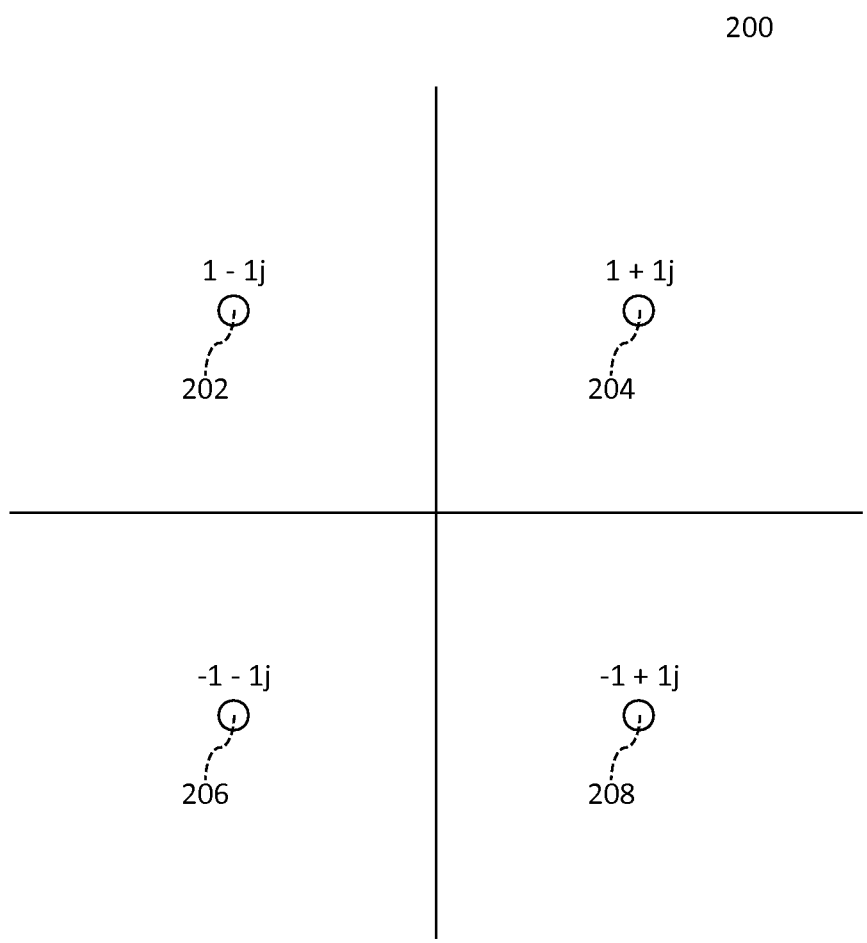
FIG. 2 shows a rectangular modulation constellation diagram.

FIG. 1 shows MIMO system 100, which may be a basic 2×2 MIMO system including MIMO transmitter 110 composed of two transmit antennas 1101 and 1102 and MIMO receiver 120 composed of two receive antennas 1201 and 1202. As shown in FIG. 2, transmit antennas 1101 and 1102 may transmit respective symbols $s_1$ and $s_2$, which may collectively compose transmit symbol vector $s=[s_1\ s_2]T$. Transmit symbols $s_1$ and $s_2$ may propagate through wireless channel 130 and be subsequently received by receive antennas 1201 and 1202, which may respectively produce receive symbols $y_1$ and $y_2$ constituting receive symbol vector $y=[y_1\ y_2]T$. As shown in FIG. 2, both receive symbols $y_1$ and $y_2$ may contain contributions from both transmit symbols $s_1$ and $s_2$, which may be characterized by the channel matrix H of wireless channel 120 where $H=[H_{1,1}\ H_{1,2}; H_{2,1}\ H_{2,2}]$ and each $H_{i,j}$ for i,j=1, 2 is a complex-valued term characterizing the wireless channel response between transmit antenna $110_j$ and receive antenna $120_i$.

Including the contribution from additive noise modeled as $n=[n_1\ n_2]T$ in wireless channel 130, MIMO system 100 may be modeled according to H, s, y, and n as follows:

$$y=Hs+n. \quad (1)$$

MIMO system 100 and Equation (3) may be analogously expanded to any M×N MIMO system with N transmit antennas (and corresponding transmit symbol vector $s=[s_1, \ldots, s_N]T$) and M receive antennas (and corresponding receive symbol vector $y=[y_1, \ldots, y_M]$), where H denotes the M×N complex channel matrix, s denotes the complex transmitted symbol vector, n denotes the complex additive noise, and y denotes the complex received noisy symbol vector. Assuming a normal distribution for both H and n, each $H_{i,j}$ may have a complex normal distribution of (0, 1) for all i=1, ..., M and j=1, ..., N while n may have a complex normal distribution of $(0, \sigma^2 I)$, where I is the identity matrix.

Each transmit symbol $s_j$, j=1, ..., N, of s may thus be a complex-valued symbol according to the particular modulation scheme of MIMO system 100. FIG. 2 shows constellation diagram 200 illustrating constellation points 202-208 for a 4-Quadrature Amplitude Modulation (QAM) scheme, where each constellation point 202-208 is denoted as a complex number as shown in FIG. 2. The set of constellation points 202-208 may be denoted as constellation $\mathcal{M}$, where $\mathcal{M}=\{+1-1j, +1+1j, -1-1j, -1+1j\}$ for the 4-QAM scheme depicted in FIG. 2. An analogous set of constellation points $\mathcal{M}$ may similarly be given for any modulation scheme, where the particular constellation points of $\mathcal{M}$ will depend on the specific characteristics of the modulation scheme. Symbol vector s may thus be a vector of N symbols, where each symbol corresponds to a particular constellation point of $\mathcal{M}$, i.e. $s \in \mathcal{M}^N$.

MIMO receiver 120 may therefore seek to recover s from noisy received symbol vector y, where y=Hs+n as detailed regarding Equation (3), where the Signal-to-Noise Ratio (SNR) at each receive antenna is given as $$SNR = \frac{M\mathbb{E}(\|s\|)^2}{\sigma^2}.$$

Accordingly, MIMO receiver 120 may produce an estimate ŝ during MIMO detection that approximates s as accurately as possible in consideration of the noise and channel effects detailed regarding Equation (3).

MIMO receiver 120 may perform MIMO detection using various different algorithms, which may each be characterized by varying tradeoffs between complexity and performance. Such MIMO detection may rely on channel estimates for H, which a MIMO receiver such as MIMO receiver 120 may determine by receiving and analyzing predefined reference signals in order to identify the channel effects of wireless channel 130 on propagated signals. In a modulation system using multiple subcarriers for data transmission, a MIMO receiver may identify a channel matrix H for each subcarrier, where each entry $H_{i,j}$, $\forall$ (for all) i=1, ..., M, j=1, ..., N, denotes the complex-valued phase and amplitude propagation effects between the $j^{th}$ transmit antenna and the $i^{th}$ receive antenna.

In terms of MIMO detection algorithms, Maximum Likelihood (ML) detectors may provide optimal performance with respect to error rate. ML detection may be characterized as follows:

$$\hat{s} = \arg\min_{s \in \mathcal{M}^N} \|y - Hs\|^2. \quad (2)$$

Accordingly, in an ML detection context MIMO receiver 120 may attempt to identify an s from the possible set $\mathcal{M}^N$ that minimizes the norm-squared term $\|y-Hs\|^2$, and apply $\mathcal{M}$ this identified symbol vector as symbol vector estimate ŝ. However, ML detection may have complexity that is exponential to the number of antennas, and accordingly may be prohibitive for practical implementations.

Linear MIMO detectors such as zero-forcing (ZF) and Minimum Mean Square Error (MMSE) detectors may offer reduced complexity compared to ML detection but may also suffer from significantly degraded performance. Linear detectors may be written as a simple matrix product followed by an element-wise quantization according to constellation $\mathcal{M}$ as follows:

$$\hat{s} = \mathcal{Q}_\mathcal{M}(Wy), \quad (3)$$

where W is a matrix that represents a linear filter operation and $\mathcal{Q}_\mathcal{M}$ quantizes each element of Wy to the nearest constellation point (symbol) in $\mathcal{M}$.

ZF and MMSE detectors may differ in the selection of the linear transformation matrix W, which in both cases involve linear manipulation of channel matrix H. In a ZF and an MMSE detector, W is given as follows $$W^{ZF}=(H^H H)^{-1} H^H, \quad (4)$$

$$W^{MMSE}=(H^H H+N\sigma^2 I_N)^{-1} H^H, \quad (5)$$

respectively, where $A^H$ denotes the Hermitian transpose of A and $I_N$ denotes the N×N identity matrix. While MMSE may offer improved detection performance compared to ZF, such linear detectors may still fall significantly short of ML detection. The performance gap relative to ML detection may be further reduced by using more complex non-linear algorithms, such as those conventionally based on successive interference cancellation (SIC) techniques. While SIC-based non-linear detectors may improve diversity gain at low-to-medium SNRs, diversity loss at higher SNR values may still be observed.

Linear detection may suffer in part due to the wireless channel effects characterized by H on the original constellation $\mathcal{M}$. These channel effects may be (in particular for rectangular constellations such as Quadrature Amplitude Modulation (QAM) or Pulse Amplitude Modulation (PAM)) appropriately modeled via lattices. Specifically, each transmit symbol vector s of dimension N may be seen as a point on an N-dimensional lattice, where each element of s gives a corresponding coordinate of the point on the lattice.

Figure 3:
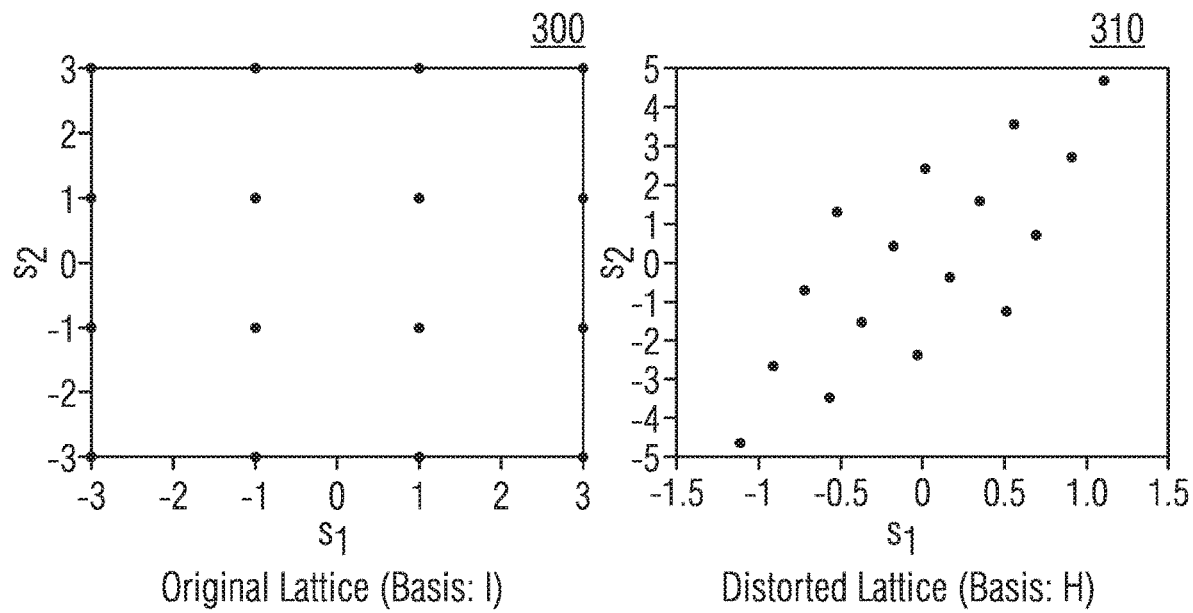
FIG. 3 shows various lattice bases related to wireless channel propagation.
Figure 3:
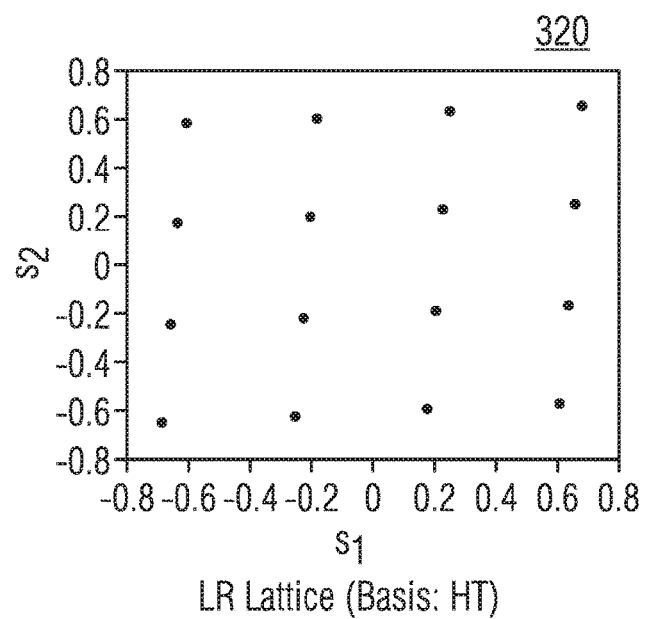

Lattice 300 in FIG. 3 shows an example of such a lattice description in the context of a 2×2 MIMO scheme utilizing a 4-PAM configuration. Accordingly, each symbol $s_1$ and $s_2$ of s may take on one of the four possible PAM symbols, e.g. $\mathcal{M} = \{-3, -1, +1, +3\}$ thus constraining $s_j \in \{-3, -1, +1, +3\}$, j=1,2. Accordingly, mapped in to N=2 dimensions $\mathcal{M}^N$ gives the overall set of possible vectors s, where each possible vector s falls onto a unique point in lattice 300. Due to the rectangular configuration of such PAM and QAM schemes, the lattice basis may be defined by $I_N$ (the N×N identity matrix) with N orthonormal basis vectors given by the N columns of $I_N$. Due to the orthogonality of each basis vector, the individual lattice points of lattice 300 may be optimally separated in space relative to one another.

However, propagation through a wireless channel characterized by channel matrix H may skew the original lattice according to H, thus resulting in distorted lattice 310 with defined by basis H, i.e. with basis vectors given as the N columns of H. Due to the assumed non-orthogonality of H, the resulting decision regions of distorted lattice 310 may be warped, thus allowing for even small amounts of noise (n) to lead to detection errors.

While linear MIMO detection may to a point apply a linear transformation to partially compensate for the distorted decision regions imparted by H, such may in many case not be sufficient to allow for suitable detection performance. Accordingly, Lattice Reduction (LR) has been proposed as a mechanism to improve linear MIMO detection performance (although LR may similarly be applied in non-linear MIMO detection to obtain analogous benefits).

Specifically, if the constellation 3C is substituted with relaxed constellation $\mathcal{M}_r = \{\alpha + \beta j\}$, $\alpha, \beta \in \mathbb{Z}$, the matrix H may be expressed as a lattice basis. LR-aided linear MIMO detection may then seek to transform H into a "more orthogonal basis" through a linear transformation $H_r=TH$ to obtain reduced basis $H_r$, where T is a complex unimodular matrix. By finding a suitable T, an LR-aided linear MIMO detector may then apply T to H in order to perform linear detection using relaxed constellation $\mathcal{M}_r$. The result may then be transformed back to lattice basis H and original constellation $\mathcal{M}$. As shown in FIG. 3, the resulting reduced lattice 320 defined by basis HT may counteract much of the distortion caused by H, thus allowing for increased detection accuracy due to the increased orthogonality of HT.

Received vector y may first need to be scaled and shifted in order for the constellation points of $\mathcal{M}$ to correspond to complex numbers with consecutive integer-value real and imaginary parts. For rectangular QAM constellations (e.g. as detailed regarding FIG. 2), such may be achieved via the following transformation of y to $y_r$:

$$y_r=1/2(y-H(1+1j)_N), \quad (6)$$

where $(1+1j)_N$ denotes the N×1 all-ones complex vector.

Linear detection on the reduced basis becomes:

$$\hat{s}_r = \lfloor W_r y_r \rceil, \quad (7)$$

where $\lfloor \cdot \rceil$ denotes the element-wise rounding operator. The linear filter $W_r$ may then be applied for ZF and MMSE detection by replacing H with $H_r=TH$ in Equations (4) and (5).

An LR-aided linear MIMO detector may thus obtain $\hat{s}$ from $\hat{s}_r$ as follows:

$$\hat{s} = \mathcal{Q}_{\mathcal{M}}(2T\hat{s}_r + (1+1j)_N) \quad (8)$$

The most difficult and computationally intensive part of LR-aided detection is the determination of the transformation matrix T, which as previously detailed is a linear transformation that orthogonalizes H. While the determination of optimal transformation matrix T (i.e. that produces a completely orthogonal $H_r$) has exponential complexity with respect to N, there exist several approximation algorithms that provide lattice reduction results that are more than adequate for MIMO detection. In the context of MIMO detection, the most popular LR algorithms are the Lenstra-Lenstra-Lovasz (LLL) algorithm and Seysen's algorithm (SA).

Both LLL and SA attempt to maximize the orthogonality of the linear transformation $H_r=HT$. While LLL attempts to minimize the so-called "orthogonality defect" of $H_r$, SA opts to minimize Seysen's metric defined as follows $$S(H) = \sum_{n=1}^{N} \|h_n\|^2 \|h_n^{-1}\|^2, \quad (9)$$

where $h_n$ and $h_n^{-1}$ denote the n-th column of H and $H^{-1}$, respectively.

SA may thus initially set $H_r=H$ and $T=I_N$, and apply an iterative gradient descent algorithm in order to minimize $S(H_r)$ over each iteration. SA may thus produce a final T (and $T^{-1}$) that provides an equivalent "more orthogonal" basis to H in the form of $H_r=TH$.

Conventional SA may utilize greedy minimization to determine the appropriate update for each iteration, and accordingly may identify a column s of T and corresponding row t of $T^{-1}$ (collectively defined by update indices {s, t}) to update by a corresponding update value $\lambda_{s,t}$ for each iteration. In a simplified overview of SA (focusing only on updates to T), SA may identify N(N−1) potential update values $\lambda_{i,j}$, i,j=1, . . . , N, where each update value $\lambda_{i,j}$ (a complex-valued scaling coefficient, as will be shortly detailed) denotes a linear combination coefficient that, if applied to linearly combine the i-th column of T with the j-th column of T to update the i-th column of T, will produce the greatest reduction in $S(H_r)$ (i.e. maximize the orthogonality of $H_r$ according to Seysen's metric, where $H_r=TH$ according to the current $\lambda_{i,j}$ at any given iteration) (the explicit equation for each $\lambda_{i,j}$ will be detailed shortly). Each $\lambda_{i,j}$ along with the associated index values i and j may thus be characterized as a "candidate" matrix update, where SA may evaluate a finite set of "candidate" matrix updates (each $\lambda_{i,j}$ for all i≠j) for T during each iteration, where each of the candidate matrix updates involves updating an i-th column of T as the result of a linear combination of the i-th column of T with the j-th column of T according to a particular update coefficient $\lambda_{i,j}$. As some candidate matrix updates $\lambda_{i,j}$ may produce greater reductions in Seysen's metric than others, SA may then evaluate each of the candidate matrix updates $\lambda_{i,j}$ in order to identify which of the candidate matrix updates would provide the greatest reduction in $S(H_r)$ if utilized to update T. Specifically, SA may determine a Seysen's metric reduction value $\Delta_{i,j}$ that identifies "how much" each candidate matrix update $\lambda_{i,j}$ would minimize $S(H_r)$. After identifying a "best" candidate matrix update $\lambda_{s,t}$, i.e. the candidate matrix update that produces the maximum Seysen's metric reduction value $\Delta_{s,t}$, SA may then update the s-th column of T (and the t-th row of $T^{-1}$) with $\lambda_{s,t}$ as a linear combination of the s-th column of T with the t-th column of T according to update coefficient $\lambda_{s,t}$.

Accordingly, SA may identify a single column s of T (and single row t $T^{-1}$), to update with $\lambda_{s,t}$ per iteration, where $\lambda_{s,t}$ is identified as the update value that, when applied to row s and column t of T and $T^{-1}$, will result in the greatest reduction of Seysen's metric for $S(H_r)$ (as indicated by $\Delta_{s,t}$). SA may thus produce a linear transformation T suitable for application to H to produce a "more orthogonal" reduced basis $H_r$, where reduced basis $H_r$ is better tailored for MIMO detection than H due to the "improved" orthogonality of $H_r$ (which may consequently be preferable for inversion due to reduced noise enhancement). It is noted that SA may equivalently update H during each iteration (where the result of each update to H is an updated $H_r$) as opposed to updating T, and may thus directly output an $H_r$; however, unless the subsequent MIMO detector (e.g. MIMO symbol detection circuit 410) requires access to $H_r$ (e.g. for an SIC-based non-linear detector), it may be advantageous to instead update T due to the possibility to calculate ŝ from T as shown above in Equation (8).

To expand on the abridged description of SA offered above, a more comprehensive description of SA will now be provided. Specifically, Seysen's metric as provided in Equation (10) may be initialized with $G=H^HH$ and $T=I_N$. SA may then utilize G and $G^{-1}$ in the calculation of the update values $\lambda$ and corresponding reduction values $\Delta$ during each iteration, where G and $G^{-1}$ may additionally be updated in order to reflect the updates to $H_r$ via T.

Each iteration of SA may include the following
1. Update value $\lambda_{i,j}$ calculation for i,j=1, . . . , N, i≠j:

$$\lambda_{i,j} = \left\lfloor \frac{1}{2}\left(\frac{G_{j,i}^{-1}}{G_{i,i}^{-1}} - \frac{G_{j,i}}{G_{j,j}}\right)\right\rceil. \quad (10)$$

2. Seysen's metric reduction value $\Delta_{i,j}$ calculation (i.e.) for i,j=1, . . . , N, i≠j:

$$\Delta_{i,j}=-2(G_{j,j}G_{i,i}^{-1}|\lambda_{i,j}|^2-G_{j,j}\,\Re\,(\lambda_{i,j}*G_{j,i}^{-1})+G_{i,i}^{-1}$$
$$\Re\,(\lambda_{i,j}*G_{j,i})). \quad (11)$$

3. Maximum $\Delta$ determination to identify indices s and t:

$$\{s,\,t\} = \arg\max_{\substack{i,j=1,\ldots,N \\ i\neq j}} \Delta_{i,j} \quad (12)$$

4. Matrix updates:
For G and $G^{-1}$ according to A and indices {s, t}:

$$G_{s,j}'=G_{s,j}+\lambda_{s,t}*G_{t,j},G_{j,s}'=(G_{s,j}')*,j\neq s, \quad (13)$$

$$G_{s,s}'=G_{s,s}+2\,\Re\,(\lambda_{s,t}*G_{t,s})+|\lambda|^2G_{t,t}, \quad (14)$$

$$G_{t,j}^{-1'}=G_{t,j}^{-1}-\lambda_{t,j}G_{s,j}^{-1},G_{j,t}^{-1'}=G(G_{t,j}^{-1'})*,j\neq t, \quad (15)$$

$$G_{t,t}^{-1'}=G_{t,t}^{-1}-2\,\Re\,(\lambda_{s,t}G_{s,t}^{-1})+|\lambda_{s,t}|^2G_{s,s}^{-1}. \quad (16)$$

Optional for H (only required if the MIMO detector that follows LR requires access to the reduced channel matrix, as in e.g. SIC-based non-linear detectors that require the calculation of the QR decomposition of $H_r$, where the final "updated" output of H gives $H_r$):

$$H_{j,s}'=H_{j,s}+\lambda_{s,t}H_{j,t},j=1,\ldots,M. \quad (17)$$

For T and $T^{-1}$:

$$T_{j,s}'=T_{j,s}+\lambda_{s,t}T_{j,t},j=1,\ldots,M, \quad (18)$$

$$T_{t,j}^{-1'}=T_{t,j}^{-1}-\lambda_{s,t}T_{s,j}^{-1},j=1,\ldots M. \quad (19)$$

As introduced in the abridged overview of SA offered above, SA may iterate over this process in order to calculate updates for T and $T^{-1}$ (and optionally H if required) during each iteration in order to minimize Seysen's metric given by Equation (9). As detailed in Equations (10)-(19), such may be accomplished via calculating N(N−1) values for $\lambda$ (i.e. the candidate matrix updates, based on the current G and $G^{-1}$) and N(N−1) values for $\Delta$ (i.e. where each $\lambda_{i,j}$ quantifies the potential orthogonality improvement in $S(H_r)$ for a given candidate matrix update $\lambda_{i,j}$ values and the current G) during each iteration, which are then applied to update G (and G−1) for use in the next iteration and to update T (and $T^{-1}$ in addition to optionally updating H to).

Seysen's algorithm may iterate until either all $\lambda_{i,j}$=0 or when a pre-determined maximum number of iterations is reached, i.e. an early termination criterion. An LR-aided MIMO detector may then apply the resulting T in order to recover ŝ as detailed above regarding Equations (6)-(8).

Accordingly, LR techniques may be applied to linear detectors such as ZF and MMSE in order to improve equalization using the reduced basis $H_r$, obtained via basis orthogonalization, thus improving detection performance. While such may improve performance, LR implementations that utilize conventional SA as detailed above may remain relatively complex in terms of computational requirements. As detailed above regarding Equations (10) and (11), each iteration may require the calculation of N(N−1) values (i.e. over all i,j=1, . . . , N, i≠j) for both $\lambda$ and $\Delta$. Additionally, the maximum determination of $\Delta$ in Equation (12) requires a maximum value search over the N(N−1) $\Delta$ values. Consequently, while an SA approach to LR-aided MIMO detection may offer some complexity reduction with respect to optimal transform matrix determination, such approaches may nevertheless exhibit quadratic complexity.

Accordingly, an enhanced MIMO receiver may apply several simplifications to conventional SA in order to reduce the associated computational complexity without excessive performance penalties in detection.

Figure 4:
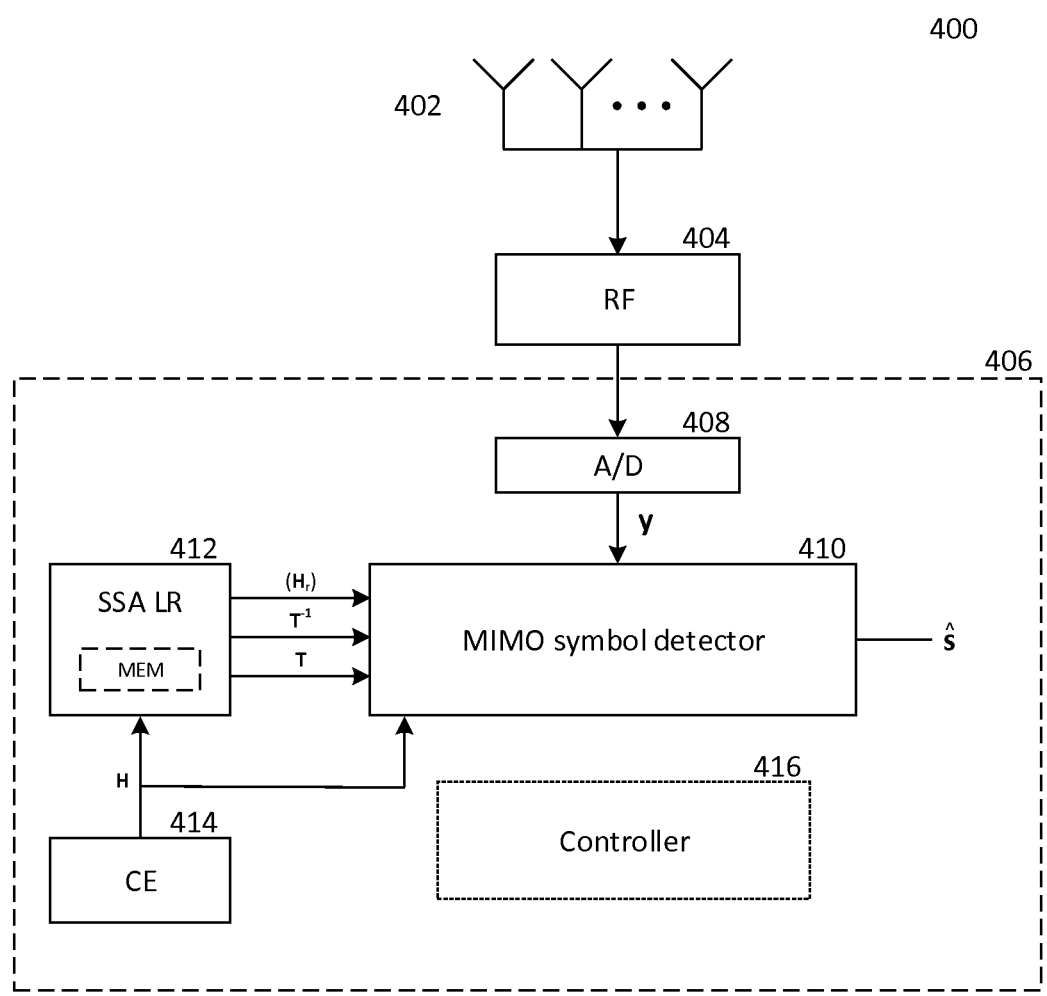
FIG. 4 shows a block diagram illustrating a MIMO receiver.

FIG. 4 shows a block diagram illustrating an internal configuration of MIMO receiver 400. As will be detailed, MIMO receiver 400 may be configured to perform LR-aided MIMO detection while applying an optimized lattice reduction algorithm. Specifically, MIMO receiver 400 may recover estimated symbol vector s using an optimized version of Seysen's algorithm, which may be potentially reduced from quadratic complexity (in the case of the original Seysen's algorithm) to linear complexity while minimizing performance degradation.

As shown in FIG. 4, MIMO receiver 400 may include MIMO antenna array 402, radio frequency (RF) processing circuit 404, and baseband processing circuit 406. MIMO receiver 400 may be implemented as either a downlink MIMO receiver or an uplink MIMO receiver. Accordingly, MIMO receiver 400 may be implemented at a mobile terminal in a mobile communication context, where MIMO receiver 400 may receive downlink MIMO signals from one or more base stations over a wireless communication network. In such a downlink context, MIMO receiver 400 may be contained in a single device, such as a mobile phone or similar mobile terminal device. Alternatively, MIMO receiver 400 may be implemented at a base station, where MIMO receiver 400 may receive uplink MIMO signals from one or more mobile terminals, in which context MIMO receiver 400 may be not be divided into an antenna array (containing antenna array 402), a Remote Radio Unit (RRU, containing radio transceiver 404), and a Baseband Unit (BBU, containing baseband processing circuit 406). Accordingly, it is appreciated that MIMO receiver 400 as detailed herein is not limited to a particular uplink/downlink context or to a specific device architecture Furthermore, it is appreciated that the one or more of the aforementioned components of MIMO receiver 400 may be integrated into a single equivalent component or divided into two separate components with collective equivalence (such as e.g. a "thick" baseband architecture with baseband processing components located at an RRU or in a "single chip" integrated baseband modem and RF front end component). It is understood that MIMO receiver 400 may have one or more additional components, such as additional hardware, software, or firmware elements including processors/microprocessors, controllers/microcontrollers, memory, other specialty or generic hardware/processors/circuits, etc., in order to support a variety of additional operations. In particular in the context of a mobile terminal device, MIMO receiver 400 may be included in a mobile terminal device that also includes a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

Expanding on the brief description presented regarding FIG. 1, MIMO receiver 400 may be configured to receive wireless signals, such as according to a particular network access protocol or radio access technology (RAT) including any of LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. MIMO antenna array 402 be composed of M antennas in accordance with an M×N MIMO system, where each antenna may receive wireless radio frequency signals and provide resulting electrical signals to RF processing circuit 404. RF processing circuit 404 may include various reception circuitry components, which may include analog circuitry configured to process externally received signals such as e.g. mixing circuitry to convert externally received RF signals to baseband and/or intermediate frequencies. RF processing circuit 404 may also include amplification circuitry to amplify externally received signals, such as power amplifiers (PAs) and/or Low Noise Amplifiers (LNAs). RF processing circuit 404 may be a transceiver component, and accordingly may also be configured to transmit wireless signals via MIMO antenna array 402. However, for purposes of explanation the receive chain will be of primary focus herein.

Baseband processing circuit 406 may be configured to establish and support connections with one or more network terminals (e.g. mobile terminals or base stations depending on an uplink or downlink context) by transmitting and receiving wireless signals over a particular wireless communication network according to corresponding network protocols. Baseband controller 416 may be configured to control the various components of baseband processing circuit 406 according to particular protocol stack of the wireless communication network, and accordingly baseband controller 416 may be protocol processor (e.g. microprocessor) configured to execute protocol stack software and/or firmware modules by retrieving corresponding program code from baseband memory (not explicitly shown in FIG. 4) and operate in accordance with control logic provided by the protocol stack software and/or firmware modules. Although not limited to such, baseband controller 416 may be configured to execute Layer 3, Layer 2, and Layer 1 (Physical or "PHY" layer) protocol stack software and/or firmware modules in order to control other components of baseband controller 406, including the PHY layer hardware of MIMO symbol detection circuit 410, Simplified Seysen's Algorithm (SSA) Lattice Reduction (LR) processing circuit 412, and channel estimator 414. Baseband controller 416 may additionally be configured to control RF transceiver 404 and antenna 402 in order to transmit and receive radio communication signals in accordance with the corresponding protocol stack.

RF processing circuit 404 may provide baseband processing circuit 406 with M separate analog data streams, where each i-th data stream corresponds to the i-th antenna of MIMO antenna array 402. Baseband processing circuit 406 may first pre-process the M analog data streams, which may include performing analog-to-digital conversion with analog-to-digital converter 408 in addition to various other preprocessing operations to produce y.

Baseband processing circuit 406 may thus obtain vector y composed of M received symbols $y_i$, i=1, . . . , M as previously detailed, where each received symbol $y_i$ may correspond to the wireless signal received by the i-th antenna of antenna array 402 over a single symbol interval (which may depend on the particular radio access technology) on a particular subcarrier, where the time-frequency resource defined by the single symbol period and particular subcarrier is shared between all symbols of received symbol vector y (i.e., a MIMO scheme).

Baseband processing circuit 406 may then perform symbol detection on received symbol vector y in order to generate estimated symbol vector s, where s approximates a the symbol vector s transmitted by N MIMO transmit antennas counterpart to MIMO antenna array 402 across a noisy wireless channel characterized by H (as detailed above regarding FIG. 1). Although the following description may detail MIMO symbol detection for a single received symbol vector y, i.e. for a single subcarrier during a single symbol interval, it is understood that baseband processing circuit 406 may perform an equivalent MIMO symbol detection for received symbol vector $y_k$, k=1, . . . , $N_{SC,MIMO}$, where $N_{SC,MIMO}$ denotes the number of subcarriers in accordance with the particular implemented MIMO scheme. Baseband processing circuit 406 may repeatedly perform such symbol detection for each symbol interval on each MIMO subcarrier over an extended period of time.

As shown in FIG. 4, MIMO symbol detection circuit 410 may receive transformation matrices T, $T^{-1}$, and (optionally, depending on the particular MIMO detection scheme of MIMO symbol detection circuit 410) reduced channel matrix $H_r$ from SSA LR processing circuit 412 in addition to channel matrix H from Channel Estimation (CE) circuit 414, and subsequently apply H, T, $T^{-1}$, and (optionally) $H_r$ to y in order to generate estimated symbol vector s. As lattice reduction is considered compatible with all MIMO detection schemes, MIMO symbol detection circuit 410 may apply any linear (e.g. ZF, MMSE, etc.) or non-linear (e.g. SIC-based or other) MIMO detection system to utilize a reduced basis $H_r$=TH to obtain ŝ. Accordingly, it is understood that SSA LR-aided MIMO detection is not limited to any particular MIMO detection scheme, and that MIMO symbol detection circuit 410 may be composed of a hardware and/or software architecture configured to perform MIMO detection according to any established MIMO detection scheme. It is noted that depending on the MIMO detection scheme of MIMO symbol detection circuit 410, SSA LR processing circuit and single column 412 may alternatively provide $H_r$ (e.g. as obtained via iterative updates to H according to Equation (17)) to MIMO detection circuit 410.

As previously indicated, the various established LR algorithms including SA and LLL operate on a channel matrix H in order to calculate a linear transformation T that when applied to H produces a substantially orthogonal basis $H_r$ as $H_r$=HT. Baseband processing circuit 406 may obtain H via CE circuit 414, which may calculate H by e.g. receiving (not explicitly shown in FIG. 4) and analyzing reference signals received from the N MIMO transmit antennas counterpart to MIMO antenna array 402 in order to obtain a complex-valued channel response term $h_{i,j}$, i=1, ..., M, j=1, ..., N that characterizes the channel response between the j-th transmit antenna and the i-th receive antenna of MIMO antenna array 402. Such channel estimation procedures are well-established, and accordingly channel estimator 414 may utilize any available channel estimation algorithm in order to calculate T and $T^{-1}$ (and optionally $H_r$) to provide to SSA LR processing circuit 412. CE processing circuit 414 may be implemented in either a hardware or software configuration, e.g. as an integrated circuit or a processing unit (e.g. microcontroller/microprocessor or DSP).

SSA LR processing circuit 412 may thus be configured to perform lattice reduction utilizing a simplified version of Seysen's algorithm (SSA) in order to obtain reduced basis orthogonalization matrix T for use by MIMO symbol detection circuit 410. The SSA procedure is considered applicable for both hardware and software implementations, although a hardware implementation may be advantageous in recognition of the problem of latency in real-time software implementations. Accordingly, SSA LR processing circuit 412 may be in the form of a processor configured to execute program code defined as instructions for as arithmetic, logical, control and input/output (I/O) operations executed on a processor, or as dedicated hardware, e.g. in the form of an integrated circuit (IC) or Field Programmable Gate Array (FPGA) with wired logic. In addition to such a processor or integrated circuit base, SSA LR processing circuit 412 may also include a memory component, which may be configured to store data during an SSA LR procedure (e.g. to hold matrix data and/or values over iterations) and/or to hold program code for retrieval and execution by SSA LR processing circuit 412.

As will be detailed, SSA LR processing circuit 412 may be orthogonalization matrix calculation circuit including a scaling coefficient calculation circuit configured to calculate a scaling coefficient for each of a plurality of candidate update operations for the orthogonalization matrix, wherein each of the plurality of candidate update operations comprise linearly combining at least one of a first column or a second column of the orthogonalization matrix previously utilized to update the orthogonalization matrix, an update operation selection circuit configured to select an optimum candidate update operation from the plurality of candidate update operations, and a matrix update circuit configured to update the orthogonalization matrix according to the scaling coefficient of the optimum candidate update operation. Additionally and/or alternatively, SSA LR processing circuit 412 may be an orthogonalization matrix calculation circuit including a scaling coefficient calculation circuit configured to calculate a scaling coefficient for each of a plurality of candidate update operations for an orthogonalization matrix, wherein each scaling coefficient is restricted to having at least one of a zero-valued real part or a zero-valued imaginary part, an update operation selection circuit configured to select an optimum candidate update operation from the plurality of candidate operations, wherein each candidate update operation of the plurality of candidate operations comprises linearly combining a candidate updatee column (i.e. a column to be updated) of the orthogonalization matrix according to a numerically scaled candidate updater column (i.e. a column to utilize to update an updatee column) of the orthogonalization matrix to update the candidate updatee column, and a matrix update circuit configured to update the orthogonalization matrix according to the scaling coefficient of the optimum candidate update operation.

As detailed above regarding Equations (10)-(19), a conventional LR approach using Seysen's algorithm has exponential complexity due to the per-iteration calculation of N(N−1) λ and Δ values, and may thus evaluate a total of N(N−1) candidate matrix updates per iteration. Furthermore, the required complex multiplication, maximum value search over all N(N−1) Δ values in Equation (12) (i.e. searching through all of the candidate matrix updates to find the "best" candidate matrix update), and in particular complex division in Equation (10) are computationally expensive, and may accordingly be problematic in implementation.

In recognition thereof, SSA LR processing circuit 412 may employ the following three modifications to a conventional SA approach to yield a "simplified" SA (SSA):

a. Reduced λ and Δ calculations: calculate only 4(N−1) λ and Δ values per iteration b. Approximate maximum selection: consider only 4(N−1) Δ values and select the maximum accordingly c. Restriction of λ coefficients: restrict $\lambda_{i,j}$ to $\lambda_{i,j} \in \alpha+\beta j$, α, $\beta \in \{-1, 0, +1\}$, $\|\lambda_{i,j}\|=0, 1$ (i.e. α and β can not be non-zero at the same time, thus restricting the magnitude of λ to 0 or 1)

SSA LR processing circuit 412 may apply the three modifications detailed above in each iteration except for the first iteration. Accordingly, the first iteration may be considered an "initialization" iteration, and may thus require "full" quadratic $\mathcal{O}(N^2)$ coimputational complexity in order to obtain all N(N−1) initial λ and Δ values. However, SSA LR processing circuit 412 may reduce the complexity of SA lattice reduction from quadratic ($\mathcal{O}(N^2)$) to linear ($\mathcal{O}(N)$) for the remaining iterations by applying the three modifications detailed above in $\mathcal{O}$ parallel. However, it is nevertheless appreciated that SSA LR processing circuit 412 may alternatively implement only one of the first simplification and the second simplification, which may still yield limited simplification over the conventional approach.

Figure 5:
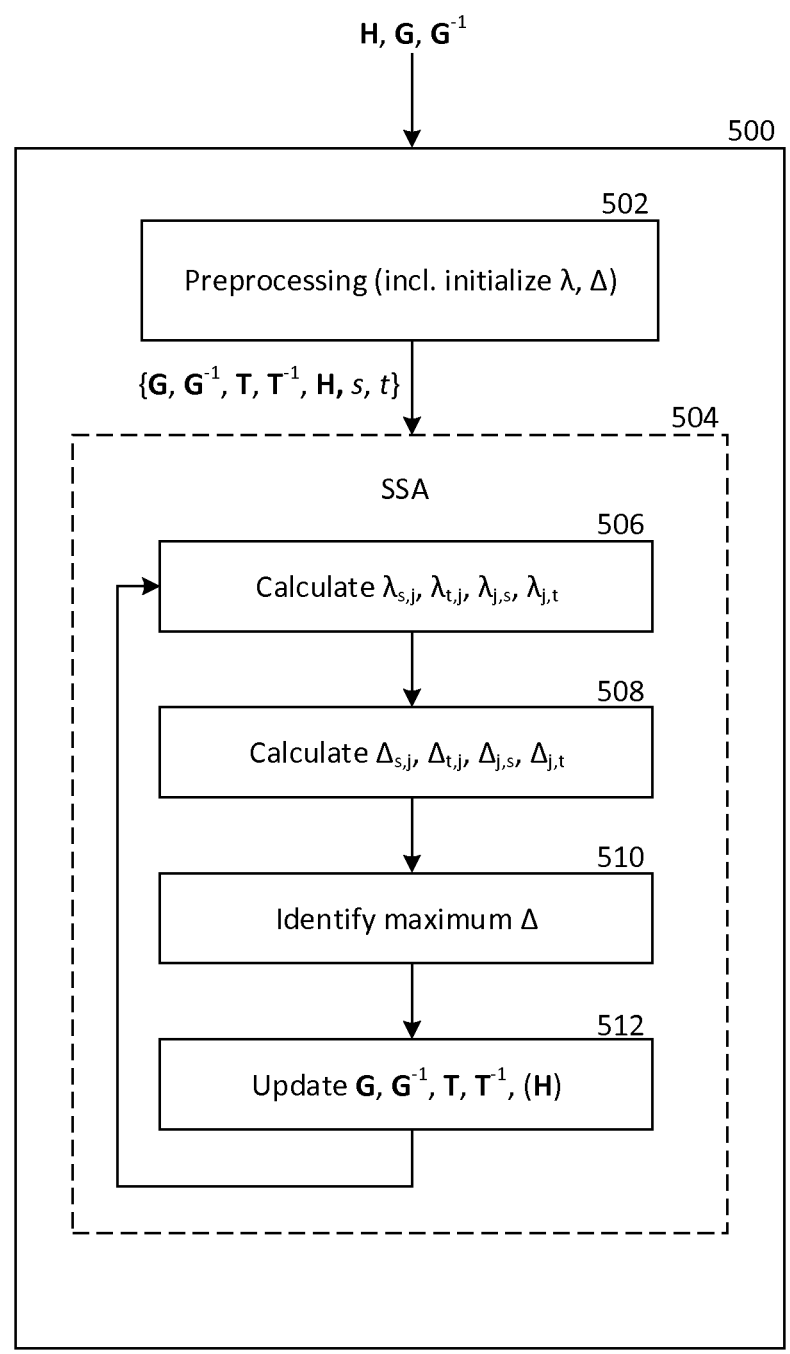
FIG. 5 shows a block diagram illustrating a flow process in an orthogonalization matrix calculation circuit.

FIG. 5 shows SSA LR procedure 500 as implemented by SSA LR processing circuit 412 in order to obtain T (and $T^{-1}$ in addition to optionally H as detailed regarding Equation (17)). SSA LR processing circuit 412 may execute SSA LR procedure 500 as either software, e.g. as program code defined as instructions for as arithmetic, logical, control and input/output (I/O) operations executed on a processor, or as hardware, e.g. in the form of an integrated circuit (IC) or Field Programmable Gate Array (FPGA) with wired logic according to the requisite operations of SSA LR procedure 500. The execution of SSA LR procedure 500 by SSA LR processing circuit 412 is thus not exclusively limited to one of software or hardware, although an advantageous solution using a Very-Large-Scale Integration (VLSI) integration will be later detailed regarding FIG. 6.

As previously indicated, SSA LR processing circuit 412 may need to calculate all N(N−1) λ and Δ values during the first iteration, i.e. as an initialization process. Accordingly, preprocessing block 502 may receive H, G, and $G^{-1}$ (where additional matrix-by-matrix multiplication and matrix inversion components of SSA LR processing circuit 412 may calculate G and $G^{-1}$, respectively, from H). Preprocessing bock 502 may then perform a complete first iteration according to Equations (10)-(19), including calculating all N(N−1) λ and Δ values (i.e. all N(N−1) possible candidate matrix updates) and identifying update indices s and t by identifying the maximum Δ value (i.e. the "optimum" candidate matrix update). Accordingly, preprocessing block 502 may implement the equivalent of a single iteration of conventional SA (with no restriction of λ values), and may obtain updated values for λ, Δ, G, $G^{-1}$, T, and $T^{-1}$. Preprocessing block 502 may then provide G, $G^{-1}$, T, $T^{-1}$, and H (optional) in addition update indices s and t as determined in the first iteration to SSA block 504.

SSA block 504 may include 506-510, which may implement Equations (10)-(19) with slight modifications according to the first, second, and third modifications introduced above. Specifically, 506 may first calculate the λ values, which may be simplified both by only calculating 4(N−1) λ values (first modification above) and by constraining the A coefficients to certain values (third modification above). Specifically, as identified in "Low-complexity MIMO data detection using Seysen's lattice reduction algorithm," Seethaler et al. ("Seethaler et al."), SA may be simplified by only calculating 4(N−1) new λ and Δ values at each iteration $\ell > 1$ while retaining the previous λ and Δ values from previous iterations (as initialized in the first iteration and updated as necessary in previous iterations). In other words, as only the s-th row and t-th row of G and $G^{-1}$ are respectively updated during each iteration (see Equations (13)-(16)), many of the λ and Δ values will be unchanged during at least the immediately succeeding iteration. Accordingly, as opposed to re-calculating all N(N−1) λ and Δ values during each iteration, the Seethaler et al. approach may instead only calculate the 4(N−1) λ values and respectively and corresponding Δ values that will be affected by the update of G and $G^{-1}$ according to update indices s and t from the immediately previous iteration.

However, the procedure proposed by Seethaler et al. still requires memory to store the N(N−1) λ and Δ values from the previous iteration and subsequently perform the maximum Δ search over all N(N−1) Δ values (i.e. thus still considering all N(N−1) possible candidate matrix updates for T and $T^{-1}$). Accordingly, while offering some complexity reduction this approach nevertheless fails to reduce the per-iteration computational complexity, resulting in $\mathcal{O}(N^2)$ complexity.

In contrast to this approach offered by Seethaler et al., with application of the first modification introduced above SSA LR processing circuit 412 may instead rely on 4(N−1) "new" λ and Δ values (i.e. a reduced subset of the overall possible candidate matrix updates for T and $T^{-1}$) calculated during each iteration in 506 and 508, and accordingly may not require any memory to store the remaining λ and Δ values from previous iterations. Specifically, at iteration $\ell + 1$, SSA LR processing circuit 412 may only calculate $\lambda_{j,s^\ell}$, $\lambda_{j,t^\ell}$, $\lambda_{s^\ell,j}$, and $\lambda_{t^\ell,j}$ (and the corresponding Δ values) at 506, where $s^\ell$ and $t^\ell$ denote the indices selected in the maximum Δ selection of Equation (12) at iteration $\mathcal{O}$ SSA LR processing circuit 412 may not $\mathcal{O}$ utilize any λ or Δ values from previous iterations, and accordingly may not require memory space to store λ and Δ values between iterations. Accordingly, SSA LR processing circuit 412 may only consider the 4(N−1) candidate matrix updates that hypothetically involve a linear combination of the $s^\ell$-th column or the $t^\ell$-th column of T (according to Equation (18), and accordingly may only calculate update values λ (i.e. scaling coefficients) for these candidate matrix updates (e.g. $\lambda_{j,s^\ell}$, $\lambda_{j,t^\ell}$, $\lambda_{s^\ell,j}$, and $\lambda_{t^\ell,j}$).

As SSA LR processing circuit 412 does not rely on stored λ or Δ values from previous iterations, SSA LR processing circuit 412 may additionally adjust 508 for maximum Δ identification in accordance with the second modification introduced above. As previously detailed, SSA LR processing circuit 412 may calculate 4(N−1) Δ values in 508 in the form of $\Delta^{\ell+1}_{j,s^\ell}$, $\Delta^{\ell+1}_{j,t^\ell}$, $\Delta^{\ell+1}_{s^\ell,j}$ and $\Delta^{\ell+1}_{t^\ell,j}$ for a given iteration ($\ell+1$), where $\Delta^{\ell+1}$ similarly indicates the Δ values calculated at iteration ($\ell+1$) analogously to the update indices $s^\ell$ and $t^\ell$ calculated at iteration $\ell$. A set $\mathcal{D}^{\ell+1}$ may thus be defined as $$\mathcal{D}^{\ell+1} = \left\{ \max_{j \neq s^\ell} \Delta^{\ell+1}_{j,s^\ell}, \max_{j \neq t^\ell} \Delta^{\ell+1}_{j,t^\ell}, \max_{j \neq s^\ell} \Delta^{\ell+1}_{s^\ell,j}, \max_{j \neq t^\ell} \Delta^{\ell+1}_{t^\ell,j} \right\}. \quad (20)$$

The maximum Δ value at iteration ($\ell+1$) can be equivalently calculated as $$\Delta^{\ell+1}_{max} = \max\left\{ \mathcal{D}^{\ell+1}, \max_{\substack{i,j \in \{1,\ldots,N\}, i \neq j, \\ i \neq s^\ell, i \neq t^\ell, j \neq s^\ell, j \neq t^\ell}} \Delta^\ell_{i,j} \right\}. \quad (21)$$

In other words, the maximum Δ value at iteration ($\ell+1$) is either equal to the maximum of the 4(N−1) new Δ values (calculated at 508 in iteration ($\ell+1$)) or to the maximum of the old Δ values when excluding rows $s^\ell$ and $t^\ell$ and columns $s^\ell$ and $t^\ell$, which may be denoted as a "second" maximum relative to the first maximum of max $\mathcal{D}^{\ell+1}$ Equation (20). However, identifying the second maximum requires finding the first maximum of the N(N−1) Δ values at each iteration, and accordingly this reformation would not lead to a complexity reduction either in identifying the maximum in 510 or in the memory required to store the Δ values from each previous iteration. Accordingly, SSA LR processing circuit 412 may instead approximate Equation (21) as $$\Delta_{max}^{\ell+1} \approx \mathcal{D}^{\ell+1} \quad (22)$$

SSA LR processing circuit 412 may thus ignore the second maximum in 510, and accordingly may only consider the 4(N−1) candidate matrix updates corresponding to $\mathcal{D}^{\ell+1}$ (e.g. $\lambda_{j,s^\ell}, \lambda_{j,t^\ell}, \lambda_{s^\ell,j}, \lambda_{t^\ell,j}$) as the candidate matrix updates for a given iteration ($\ell$ +1). As SSA LR processing circuit 412 may only be ignoring a single potential value in Equation (21), the effect of this approximation on performance will likely be small. Furthermore, SSA LR processing circuit 412 may not need to store any Δ values from previous iterations, and accordingly may rely only on the "new" 4(N−1) Δ values $\Delta_{j,s^\ell}^{\ell+1}, \Delta_{j,t^\ell}^{\ell+1}, \Delta_{s^\ell,j}^{\ell+1}$ and $\Delta_{t^\ell,j}^{\ell+1}$ calculated each iteration ($\ell$ +1) based on $s^\ell$ and $t^\ell$ from the previous iteration $\ell$.

In the third modification introduced above, SSA LR processing circuit 412 may restrict the λ coefficients calculated during each iteration to certain values, which may both assist in efficient computation of λ values in addition to eliminating division operations (e.g. in the calculation of Equation (10)) and reducing addition and multiplication operations.

Specifically, as proposed in "Low-complexity Seysen's algorithm based lattice reduction-aided MIMO detection for hardware implementations," Bruderer et al. ("Bruderer et al.), the $\lambda_{i,j}$ coefficients may be restricted to $\lambda_{i,j} \in \{\alpha+\beta j\}$, α, β∈{−1,0, +1}. By restricting the coefficients, a hypothetical SSA LR algorithm may significantly reduce the complexity of SA as $\lambda_{i,j}$ may be computed from G and $G^{-1}$ without any need for division operations (according to Equation (10)), which may be particularly costly to implement in hardware.

Specifically, Bruderer et al. have proposed the following simplification:

$$d_{i,j} = G_{j,i}^{-1} G_{j,j} - G_{j,i} G_{i,i}^{-1}, p_{i,j} = G_{i,i}^{-1} G_{j,j}, \quad (23)$$

The real α and imaginary β parts of $\lambda_{i,j}$ may then be calculated as $$\Re(\lambda_{i,j}) = \begin{cases} 0, & |\Re(d_{i,j})| < p_{i,j}, \\ \text{sign}(\Re(d_{i,j})) \text{sign}(p_{i,j}), & \text{otherwise} \end{cases} \quad (24)$$

$$\Im(\lambda_{i,j}) = \begin{cases} 0, & |\Im(d_{i,j})| < p_{i,j}, \\ \text{sign}(\Im(d_{i,j})) \text{sign}(p_{i,j}), & \text{otherwise} \end{cases} \quad (25)$$

Accordingly, the approach of Bruderer et al. may allow for replacement of complex multiplication with conditional additions. SSA LR processing circuit 412 may further reduce complexity by applying an additional constraint on the $\lambda_{i,j}$ coefficients as introduced above regarding the third modification. As opposed to only restricting $\lambda_{i,j} \in \{\alpha+\beta j\}$, α, β∈{−1,0, 1}, 506 may additionally impose that $|\lambda_{i,j}|=0$, 1, thus requiring that both ac and P can not be non-zero at the same time. In order to achieve this, 502 may simply evaluate (24) and (25) separately for the real and imaginary part of $\lambda_{i,j}$, and may ensure that $|\lambda_{i,j}|=\{0, 1\}$ by setting one of $\Re(\lambda_{i,j})$ or $\Im(\lambda_{i,j})$ to zero if both $\Re(\lambda_{i,j})\neq 0$ and $\Im(\lambda_{i,j})\neq 0$. As randomly setting one of $\Re(\lambda_{i,j})$ or $\Im(\lambda_{i,j})$ to zero offers the same performance, 502 may simply select to either set the real or imaginary part of $\lambda_{i,j}$ to zero during every such "conflict", e.g. by selecting one of $\Re(\lambda_{i,j})$ or $\Im(\lambda_{i,j})$ to set to zero in every occasion in which $\Re(\lambda_{i,j})\neq 0$ and $\Im(\lambda_{i,j})\neq 0$.

Additionally, due to the simplification detailed above regarding the constraint of $\lambda_{i,j}$ according to the first modification, each calculation of a given x where x≜ λ*G (indices dropped for simplicity) may be simplified as a simple conditional selection as follows:

$$\Re(x) = \begin{cases} \Re(\lambda)\Re(G), & \Re(\lambda)\neq 0, \Im(\lambda)=0, \\ \Im(\lambda)\Im(G), & \Re(\lambda)=0, \Im(\lambda)\neq 0, \\ 0, & \Re(\lambda)=0, \Im(\lambda)=0, \end{cases} \quad (26)$$

$$\Im(x) = \begin{cases} \Re(\lambda)\Re(G), & \Re(\lambda)\neq 0, \Im(\lambda)=0, \\ -\Im(\lambda)\Im(G), & \Re(\lambda)=0, \Im(\lambda)\neq 0, \\ 0, & \Re(\lambda)=0, \Im(\lambda)=0, \end{cases} \quad (27)$$

where the case $\Re(\lambda)\neq 0$, $\Im(\lambda)\neq 0$ is not considered as such is prohibited by the aforementioned $|\lambda_{i,j}|=0$, 1 constraint. Accordingly, SSA LR processing circuit 412 may implement conditional selections as opposed to conditional additions (as proposed by Bruderer et al.), which may thus save two real additions per matrix element update (i.e. one for the real part and one for the imaginary part) compared to the $\lambda_{i,j}$ constraint proposed by Bruderer et al. SSA LR processing circuit 412 may employ this conditional selection simplification in all applicable calculations involving λ (e.g. both in 508 and 510), and accordingly may significantly reduce the number of divisions, multiplications, and additions required for SSA LR procedure 500.

After completing 506-510 according to the three modifications detailed above SSA LR processing circuit 412 may continue to 512 to perform the necessary iteration updates for G, $G^{-1}$, T, $T^{-1}$, and (optionally) H according to Equations (13)-(19). As maximum Δ identification in 510 has been similarly reduced to 4(N−1) complexity (likewise to λ and Δ calculation in 506 and 508), each of 506-512 of SSA block 504 may be of linear computational complexity with respect to N, i.e. $\mathcal{O}$ (N). Accordingly, the initialization of λ and Δ in preprocessing block 502 may be the only remaining portion of SSA LR procedure 500 retaining quadratic complexity $\mathcal{O}$ ($N^2$). However, as SSA LR processing circuit 500 only needs to perform preprocessing block 502 once per SSA LR procedure, the increased computational cost of preprocessing block 502 may be amortized over the following iterations of SSA block 504.

Following completion of 512, SSA LR processing circuit 510 may then repeat SSA block 504 by returning back to 504 to perform the next iteration. i.e. by evaluating a new set of candidate matrix updates to select an "optimum" candidate matrix update to apply to T (where the set of candidate matrix updates for each iteration is restricted according to values for s and t from the previous iteration). As previously indicated, SSA LR processing circuit 412 may continue to iterate through SSA block 504 either until each $\lambda_{i,j}=0$ or until a predetermined number of iterations are reached. At the conclusion of each iteration in 512, SSA LR processing circuit 412 may produce a valid reduced basis transformation matrix T for H, and may at conclusion produce a transformation matrix T that when linearly applied to H as $H_r=TH$ produces a reduced basis $H_r$ with greater orthogonality. SSA LR processing circuit 412 may then provide H (which SSA LR processing circuit 412 may update depending on the detection scheme employed by MIMO symbol detection circuit 410 as indicated regarding Equation (17)) in addition to T and $T^{-1}$ to MIMO symbol detection circuit 410. MIMO symbol detection circuit 410 may then apply H (i.e. the original unadjusted channel matrix H), T, and $T^{-1}$ to received symbol vector y to generate estimated symbol vector ŝ. As previously indicated, MIMO symbol detection circuit 410 may not be limited to a particular MIMO detection scheme, as lattice reduction may be beneficial for any such MIMO detection scheme due to the requisite reliance of MIMO detection schemes on channel matrix H. Regardless, the SSA LR procedure executed by SSA LR processing circuit 412 may be particularly advantageous when combined with linear MIMO detectors, as such "lattice reduction aided" (LR-aided) linear detection may offer the reduced complexity of linear MIMO detectors alongside the significant performance boost associated with MIMO detection using a substantially orthogonal channel matrix.

As previously indicated, SSA LR processing circuit 412 may implement SSA LR procedure 500 as either hardware or software. For example, SSA LR processing circuit 412 may contain a processing circuit configured to execute program code such as a microprocessor, which may be configured to execute 502-504 utilizing program code corresponding to the equations and control flow detailed above. However, due to the latency associated with such software solutions, SSA LR processing circuit 412 may alternatively implement SSA LR procedure 500 as hardware in the form of an integrated circuit or programmable gate array configured to execute 502-504 in the form of wired logic.

Figure 6:
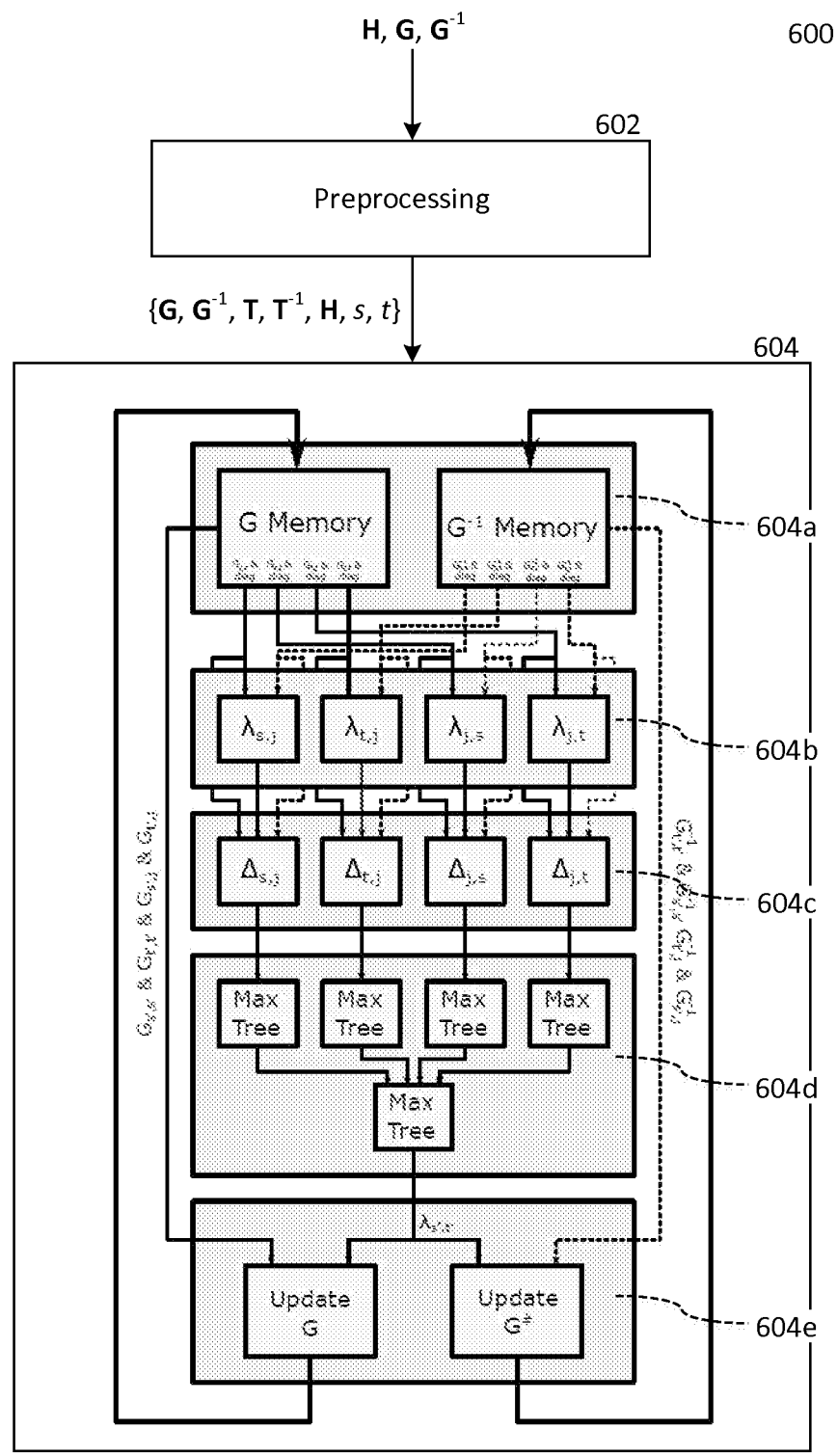
FIG. 6 shows a high-level circuit diagram of an orthogonalization matrix calculation circuit.

FIG. 6 shows an implementation of SSA LR procedure 500 in the form of a VLSI SSA LR architecture 600, which may be included in SSA LR processing circuit 412. VLSI SSA LR architecture 600 may include preprocessing block 602, which may implement the first SSA iteration (analogous to preprocessing block 602) with complexity $\mathcal{O}(N^2)$ and SSA block 604 (analogous to SSA block 504) which performs the remaining SSA iterations with complexity $\mathcal{O}(N)$. It is noted that a matrix-by-matrix multiplication and matrix inversion blocks needed for the calculation of G and $G^{-1}$ may not be considered as part of the SSA LR procedure as both calculations are in any case required to implement an MMSE detector. Accordingly, while matrix-by-matrix multiplication and matrix inversion blocks may be included with SSA LR processing circuit 412 (in either hardware or software form), such blocks may not be exclusively included within VLSI SSA LR architecture 600. Block preprocessing block 602 and SSA block 604 may include dedicated memories and operate in a pipelined fashion, thus allowing preprocessing block 602 to process a new channel matrix while SSA block 604 processes the previous channel matrix.

Preprocessing block 602 may include two pipeline stages, each requiring one clock cycle. The first stage calculates (N−1) $\lambda_{i,j}$ values in parallel and the second stage calculates (N−1) $\Delta_{i,j}$ values in parallel and updates the maximum Δ value, thus initializing the s and t update indices for the remaining iterations. After all λ and Δ values have been processed, preprocessing block 602 updates the G, $G^{-1}$, T, and $T^{-1}$ matrices in a single clock cycle, thus yielding an overall latency of preprocessing block 602 as $L_{PP}=2N+1$ (measured in clock cycles).

SSA block 604 may then operate on the updated G, $G^{-1}$, T, and $T^{-1}$ provided by preprocessing block 602. As shown in FIG. 6, SSA block 604 may include dedicated memory (604a) and four pipeline stages: λ stage 604b (analogous to 506), Δ stage 604c (analogous to 508), maximum Δ stage 604d (analogous to 510), and matrix update stage 604e (analogous to 512). SSA block 604 may be configured to operate each pipeline stage in one clock cycle. Analogous to as detailed in FIG. 5, each corresponding pipeline stage of SSA block 604 may employ the optimizations of Equations (24) and (25) paired with constraint of all λ values to $|\lambda|=\{0, 1\}$ and conditional selections Equations (26) and (27) in addition the maximum Δ search simplification of Equation (21).

As shown in FIG. 6, λ stage 604b may include four λ blocks, each containing (N−1) λ calculation circuits, in order to calculate all $\lambda_{j,s}$, $\lambda_{j,t}$, $\lambda_{s,j}$, and $\lambda_{t,j}$ values in parallel (using the previous update indices $s^\ell$ and $t^\ell$ from immediately previous iteration $\ell$). Such may allow for a more regular architecture although $\lambda_{s,t}$ and $\lambda_{t,s}$ may be calculated twice.

Δ stage 604c may similarly include four Δ blocks, each containing (N−1) Δ calculation circuits, in order to calculate all $\Delta_{j,s}$, $\Delta_{j,t}$, $\Delta_{s,j}$, and $\Delta_{t,j}$ values in parallel using the λ values from λ stage 604b.

Maximum Δ stage 604d may then identify the maximum Δ from the 4(N−1) Δ values produced by Δ stage 604c. Maximum Δ stage 604d may additionally identify the update indices {s, t}.

Finally, matrix update stage 604e may update the rows and columns of G, $G^{-1}$ and T, $T^{-1}$ (and optionally H) according to the update indices {s, t} selected by maximum Δ stage 604d.

When processing a single channel matrix H (i.e. for a single subcarrier), each pipeline stage of SSA block 604 may be idle for 75% of the duration of each iteration. In order to improve the hardware utilization of SSA block 604, SSA block 604 may additionally include four dedicated G, $G^{-1}$, and T, $T^{-1}$ memories (in addition to optionally H memories). SSA block 604 may thus be able to process four channel matrices in parallel in a pipelined procedure.

Due to the necessary presence of a significant number of multipliers, the design of SSA block 604 may be logic-dominated. Accordingly, allowing for parallel processing of four channel matrices in parallel increases the area only slightly while increasing the throughput by four times, thus resulting in an overall increase in hardware efficiency.

SSA block 604 may additionally implement an early-termination scheme as opposed to terminating when all $\lambda_{i,j}=0$. Similarly as detailed in Seethaler et al., SSA block 604 may implement an early termination scheme based on $\Delta_{i,j}$. Accordingly, SSA block 604 may stop processing a given channel matrix when all $\Delta_{i,j}=0$ or, equivalently, when max $\lambda_{i,j}=0$, which may easily be accessed and checked from maximum Δ stage 604d. However, to maintain regular pipeline timing, SSA block 604 may keep the channel matrix in memory for the maximum number of iterations, denoted by $\ell_{max}$. The early-termination scheme may thus be intended to reduce power consumption and not to increase throughput. The overall latency of SSA block 604 is thus $L_{SSA}=4(\ell_{max}-1)$.

SSA block 604 may additionally utilize several distinct quantization bit-widths for the quantities involved in the computations. Specifically, SSA block 604 may utilize $Q_G$ quantization bits for elements of G and $G^{-1}$ and $Q_T$ quantization bits for elements of T and $T^{-1}$. SSA block 604 may additionally employ reduced-width λ and Δ calculation employed in "A lattice reduction aided MIMO channel equalizer in 90 nm CMOS achieving 720 Mb/s,", Senning et al. ("Senning et al."). Specifically, SSA block 604 may perform the computations of λ and Δ using only $Q_{\lambda,\Delta}$ quantization bits of the $Q_G$ bits that are used to represent the elements of G and $G^{-1}$. Finally, in case the H memory and update units are also instantiated, SSA block 604 may store the elements of H using $Q_H$ quantization bits.

SSA block 604 can provide one output every ($\ell_{max}-1$) clock cycles. If preprocessing block 602 can provide SSA block 604 with input at the same (or higher) rate, then the overall throughput of VLSI SSA LR architecture 600 is dictated by SSA block 604; otherwise, overall throughput is dictated by SSA block 604. The overall throughput provided by SSA block 604 measured in MMatrices/s may thus be given as $$T = \frac{f_{clk}}{\max\{\ell_{max} - 1, 2N + 1\}}, \tag{28}$$

where $f_{clk}$ denotes the clock frequency of the decoder measured in MHz.

Accordingly, SSA LR processing circuit 412 may be implemented as either hardware or software, and may produce an improved basis in the form of H and linear transformation T which MIMO symbol detection circuit 410 may apply to obtain estimated symbol vector ŝ. Due to the improved orthogonality offered by reduced basis $H_r$, MIMO symbol detection circuit 410 may improve detection performance, and accordingly may be suitably implemented as a linear detector such as a ZF or MMSE detector as previously detailed.

Figure 7:
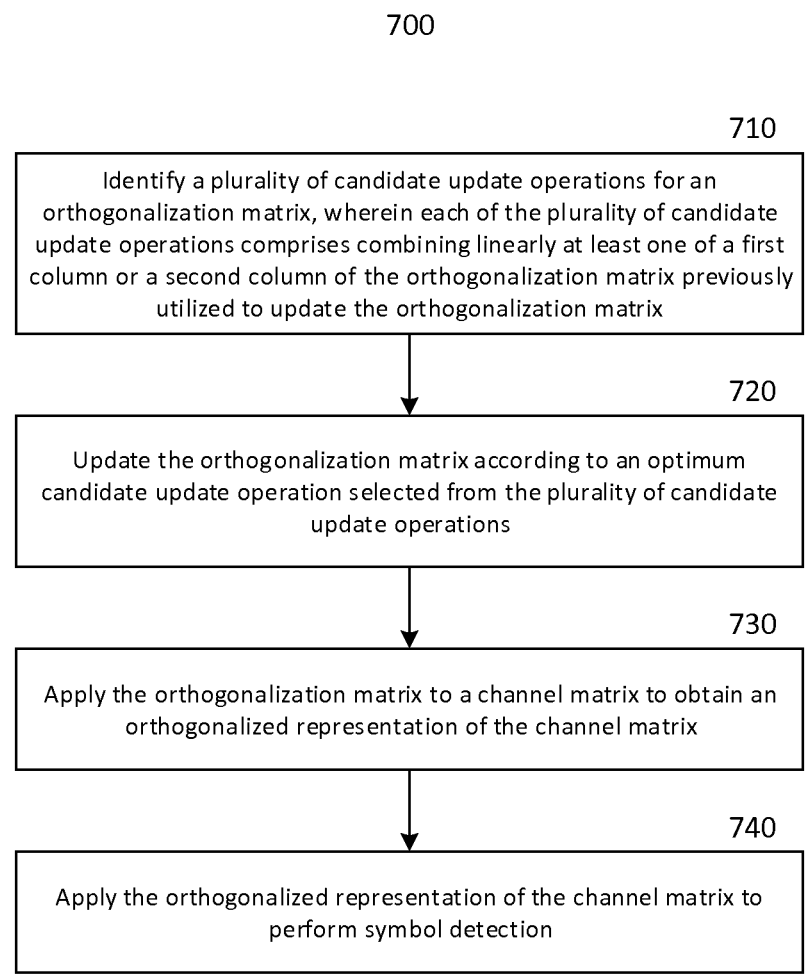
FIG. 7 shows a method for performing MIMO symbol detection according to a first aspect of the disclosure.

FIG. 7 shows a flow chart illustrating method 700 for performing MIMO symbol detection. As shown in FIG. 7, method 700 includes identifying a plurality of candidate update operations for an orthogonalization matrix (710), wherein each of the plurality of candidate update operations comprise linearly combining at least one of a first column or a second column of the orthogonalization matrix previously utilized to update the orthogonalization matrix, updating the orthogonalization matrix according to an optimum candidate update operation selected from the plurality of candidate update operations (720), applying the orthogonalization matrix to a channel matrix to obtain an orthogonalized representation of the channel matrix (730), and applying the orthogonalized representation of the channel matrix to perform symbol detection (740).

In one or more further exemplary aspects of the disclosure, one or more of the features described above in reference to FIGS. 1-6 may be further incorporated into method 700. In particular, method 700 may be configured to perform further and/or alternate processes as detailed regarding SSA LR processing circuit 412, MIMO symbol detector 410, and/or MIMO receiver 400.

Figure 8:
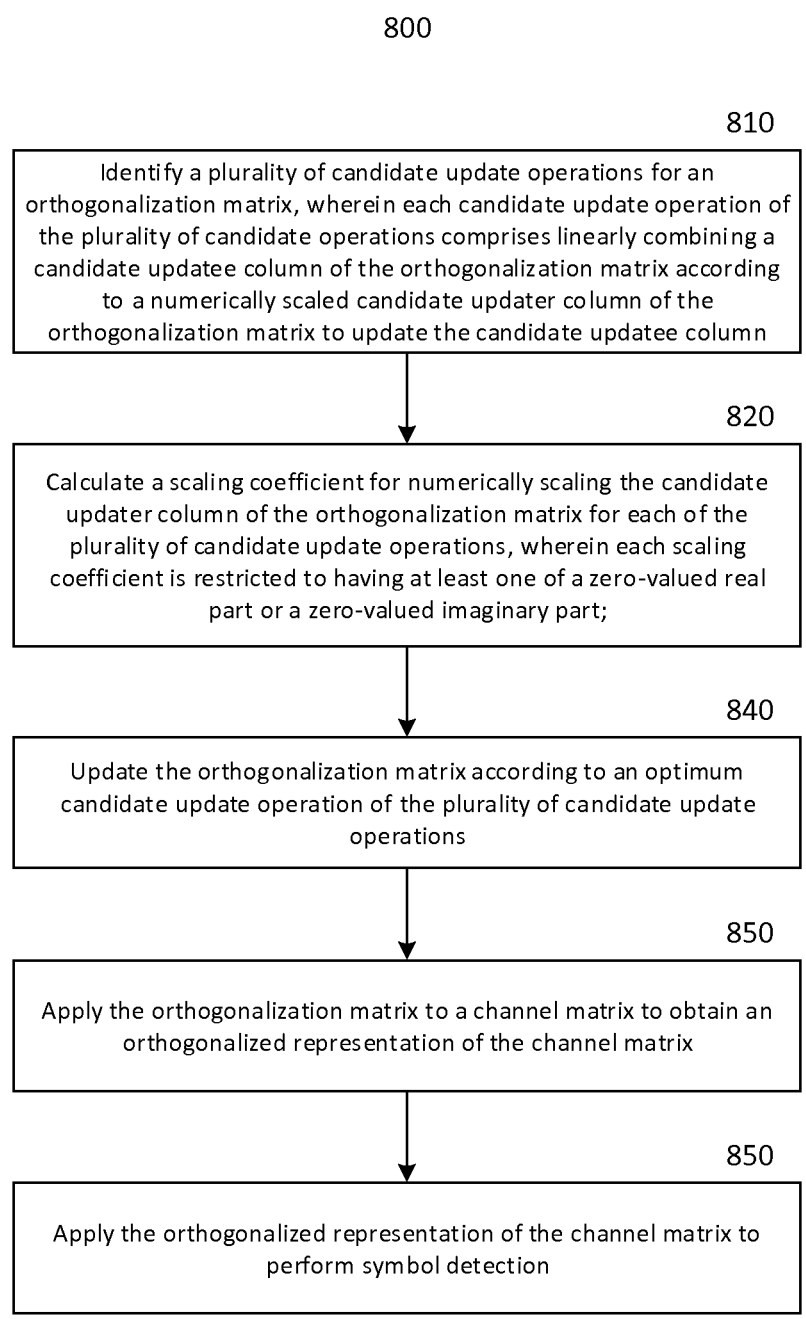
FIG. 8 shows a method for performing MIMO symbol detection according to a second aspect of the disclosure.

FIG. 8 shows a flow chart illustrating method 800 for performing MIMO symbol detection. As shown in FIG. 8, method 800 includes identifying a plurality of candidate update operations for an orthogonalization matrix (810), wherein each candidate update operation of the plurality of candidate operations comprises linearly combining a candidate updatee column of the orthogonalization matrix according to a numerically scaled candidate updater column of the orthogonalization matrix to update the candidate updatee column, calculating a scaling coefficient for numerically scaling the candidate updater column of the orthogonalization matrix for each of the plurality of candidate update operations (820), wherein each scaling coefficient is restricted to having at least one of a zero-valued real part or a zero-valued imaginary part, updating the orthogonalization matrix according to an optimum candidate update operation of the plurality of candidate update operations (830), applying the orthogonalization matrix to a channel matrix to obtain an orthogonalized representation of the channel matrix (840), and applying the orthogonalized representation of the channel matrix to perform symbol detection (850).

In one or more further exemplary aspects of the disclosure, one or more of the features described above in reference to FIGS. 1-6 may be further incorporated into method 800. In particular, method 800 may be configured to perform further and/or alternate processes as detailed regarding SSA LR processing circuit 412, MIMO symbol detector 410, and/or MIMO receiver 400.

Although the lattice reduction approach using a modified Seysen's algorithm has been detailed above in a MIMO detection context, it is appreciated that the implementations detailed herein may be applied to any lattice reduction procedure, in particular including cryptography or other multi-user symbol detection schemes, including e.g. CDMA>.

It is appreciated that the terms "user equipment", "UE", "mobile terminal", etc., may apply to any wireless communication device, including cellular phones, tablets, laptops, personal computers, wearables, multimedia playback devices, consumer/home appliances, vehicles, etc., and any number of additional electronic devices capable of wireless communications.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

All acronyms defined in the above description additionally hold in all claims included herein.

The following examples pertain to further aspects of the disclosure:

Example 1 is a method for performing symbol detection, the method comprising: identifying a plurality of candidate update operations for an orthogonalization matrix, wherein each of the plurality of candidate update operations comprises combining linearly at least one of a first column or a second column of the orthogonalization matrix previously utilized to update the orthogonalization matrix; updating the orthogonalization matrix according to an optimum candidate update operation selected from the plurality of candidate update operations; applying the orthogonalization matrix to a channel matrix to obtain an orthogonalized representation of the channel matrix; and applying the orthogonalized representation of the channel matrix to perform symbol detection.

In Example 2, the subject matter of Example 1 can optionally include further comprising performing a plurality of iterations of a matrix orthogonality procedure, wherein each iteration of the plurality of iterations includes identifying an updated plurality of candidate update operations for the orthogonalization matrix based on an optimum candidate operation from the immediately preceding iteration and updating the orthogonalization matrix according to an optimum candidate update operation selected from the updated plurality of candidate update operations.

In Example 3, the subject matter of Example 2 can optionally include further comprising performing an initiation stage of the matrix procedure, the initiation stage comprising: identifying an initial plurality of candidate update operations for the orthogonalization matrix, wherein the initial plurality of candidate update operations collectively include candidate update operations that comprise combining linearly each column of the orthogonalization matrix.

In Example 4, the subject matter of any one of Examples 1 to 3 can optionally include further comprising selecting the optimum candidate update operation from the plurality of candidate update operations based on which of the plurality of candidate update operations provides a maximum reduction in Seysen's metric.

In Example 5, the subject matter of any one of Examples 1 to 3 can optionally include further comprising selecting the optimum candidate update operation from the plurality of candidate update operations based on which of the plurality of candidate update operations provides a maximum reduction in a Seysen's metric measurement of the orthogonalized representation of the channel matrix.

In Example 6, the subject matter of any one of Examples 1 to 3 can optionally include further comprising selecting the optimum candidate update operation from the plurality of candidate update operations.

In Example 7, the subject matter of any one of Examples 1 to 3 can optionally include further comprising selecting the optimum candidate update operation from the plurality of candidate update operations according to an orthogonality improvement metric of each of the plurality of candidate update operations.

In Example 8, the subject matter of Example 6 or 7 can optionally include further comprising: calculating the orthogonality improvement metric of each of the plurality of candidate update operations based on Seysen's orthogonality metric.

In Example 9, the subject matter of Example 6 or 7 can optionally include further comprising: calculating the orthogonality improvement metric of each of the plurality of candidate update operations based on an orthogonality evaluation expression that quantifies the orthogonality of the orthogonalized representation of the channel matrix.

In Example 10, the subject matter of Example 7 can optionally include wherein the orthogonality improvement metric of the optimum candidate update operation quantifies an improvement in orthogonality of the orthogonalized representation of the channel matrix according to the orthogonalization matrix.

In Example 11, the subject matter of any one of Examples 1 to 10 can optionally include further comprising: receiving a symbol vector on a channel, wherein the applying the orthogonalized representation of the channel matrix to perform symbol detection comprises: performing symbol detection on the symbol detector with the orthogonalized representation of the channel matrix to obtain a recovered symbol vector.

In Example 12, the subject matter of any one of Examples 1 to 11 can optionally include wherein the updating the orthogonalization matrix according to an optimum candidate update operation selected from the plurality of candidate update operations comprises: updating an updatee column of the orthogonalization matrix by adding a numerically scaled version of an updater column of the orthogonalization matrix to the updatee column.

In Example 13, the subject matter of Example 12 can optionally include wherein at least one of the updatee column or the updater column is the first column of the orthogonalization matrix or the second column of the orthogonalization matrix.

In Example 14, the subject matter of Example 12 can optionally include wherein the numerically scaled version of the updater column is the updater column numerically scaled by a scaling coefficient.

In Example 15, the subject matter of any one of Examples 1 to 11 can optionally include further comprising calculating a scaling coefficient for each of the plurality of candidate update operations, wherein the updating the orthogonalization matrix according to the optimum candidate update operation selected from the plurality of candidate update operations comprises: updating an updatee column of the orthogonalization matrix by adding a version of an updater column of the orthogonalization matrix that is numerically scaled according to the scaling coefficient of the optimum candidate update operation to the updatee column.

In Example 16, the subject matter of Example 15 can optionally include wherein the respective scaling coefficient of each of the plurality of candidate update operations is complex valued.

In Example 17, the subject matter of Example 15 can optionally include wherein the calculating a scaling coefficient for each of the plurality of candidate update operations comprises: restricting the scaling coefficient of each of the plurality of candidate update operations to have at least one of a zero real part or a zero imaginary part.

In Example 18, the subject matter of Example 15 can optionally include wherein the calculating a scaling coefficient for each of the plurality of candidate update operations comprises: restricting the domain of each of the scaling coefficients to have at least one of a zero real part or a zero imaginary part.

In Example 19, the subject matter of Example 17 or 18 can optionally include wherein the calculating a scaling coefficient for each of the plurality of candidate update operations further comprises: restricting each of the scaling coefficients to have a magnitude less than or equal to one.

In Example 20, the subject matter of any one of Examples 1 to 11 can optionally include wherein the first column or the second column of the orthogonalization matrix were previously utilized to update the orthogonalization matrix by: updating the first column of the orthogonalization matrix by as the result of a linear combination of the first column of the orthogonalization matrix with a numerically scaled version of the second column of the orthogonalization matrix.

In Example 21, the subject matter of any one of Examples 1 to 11 can optionally include wherein the first column or the second column of the orthogonalization matrix were previously utilized to update the orthogonalization matrix in a first iteration of a matrix orthogonalization procedure; and wherein the identifying a plurality of candidate update operations for an orthogonalization matrix occurs in a second iteration of the matrix orthogonalization procedure immediately following the first iteration.

In Example 22, the subject matter of any one of Examples 1 to 21 can optionally include wherein applying the orthogonalization matrix to a channel matrix to obtain an orthogonalized representation of the channel matrix comprises: performing a matrix-by-matrix multiplication of the orthogonalization matrix and the channel matrix to obtain the orthogonalized representation of the channel matrix.

In Example 23, the subject matter of any one of Examples 1 to 22 can optionally include wherein the number of candidate update operations of the plurality of candidate update operations are linear with respect to the order of the symbol detection.

In Example 24, the subject matter of any one of Examples 1 to 23 can optionally include wherein the plurality of candidate update operations are a smaller subset of a finite number of possible candidate update operations for the orthogonalization matrix.

In Example 25, the subject matter of Example 24 can optionally include wherein the plurality of candidate operations only include candidate operations of the finite number of possible candidate update operations that comprise combining linearly at least one of the first column or the second column of the orthogonalization matrix.

In Example 26, the subject matter of Example 24 can optionally include wherein the finite number of possible candidate update operations for the orthogonalization matrix comprise a linear combination for each column of the orthogonalization matrix, and wherein the plurality of candidate update operations contain only candidate update operations that comprise a linear combination of at least one of a first column or a second column of the orthogonalization matrix previously utilized to update the orthogonalization matrix.

In Example 27, the subject matter of Example 1 can optionally include wherein each of the plurality of candidate update operations involve updating an updatee column of the orthogonalization matrix by adding a numerically scaled version of an updater column of the orthogonalization matrix to the updatee column, wherein at least one of the updatee column or the updater column is the first column of the orthogonalization matrix or the second column of the orthogonalization matrix.

In Example 28, the subject matter of any one of Examples 1 to 27 can optionally include wherein the applying the orthogonalized representation of the channel matrix to perform symbol detection comprises: applying the orthogonalized representation of the channel matrix to perform MIMO symbol detection.

Example 29 is a receiver comprising symbol detection circuitry configured to perform the method of any one of Examples 1 to 28.

In Example 30, the subject matter of Example 29 can optionally include configured as a mobile terminal device or a base station.

Example 31 is a receiver comprising a memory and a processor configured to operate according to program code stored in the memory, the processor further configured to perform the method of any one of Examples 1 to 28.

Example 32 is a method for performing symbol detection, the method comprising: identifying a plurality of candidate update operations for an orthogonalization matrix, wherein each candidate update operation of the plurality of candidate operations comprise linearly combining a candidate updatee column of the orthogonalization matrix according to a numerically scaled candidate updater column of the orthogonalization matrix to update the candidate updatee column; calculating a scaling coefficient for numerically scaling the candidate updater column of the orthogonalization matrix for each of the plurality of candidate update operations, wherein each scaling coefficient is restricted to having at least one of a zero-valued real part or a zero-valued imaginary part; updating the orthogonalization matrix according to an optimum candidate update operation of the plurality of candidate update operations; applying the orthogonalization matrix to a channel matrix to obtain an orthogonalized representation of the channel matrix; and applying the orthogonalized representation of the channel matrix to perform symbol detection.

In Example 33, the subject matter of Example 32 can optionally include wherein each scaling coefficient is further restricted to having a magnitude less than or equal to zero.

In Example 34, the subject matter of Example 32 or 33 can optionally include further comprising performing a plurality of iterations of a matrix orthogonalization procedure, wherein each iteration of the plurality of iterations includes identifying an updated plurality of candidate update operations for the orthogonalization matrix and updating the orthogonalization matrix according to an optimum candidate update operation of the updated plurality of candidate update operations.

In Example 35, the subject matter of any one of Examples 32 to 34 can optionally include further comprising selecting the optimum candidate update operation from the plurality of candidate update operations based on which of the plurality of candidate update operations provides a maximum reduction in Seysen's metric.

In Example 36, the subject matter of any one of Examples 32 to 34 can optionally include further comprising selecting the optimum candidate update operation from the plurality of candidate update operations based on which of the plurality of candidate update operations provides a maximum reduction in a Seysen's metric measurement of the orthogonalized representation of the channel matrix.

In Example 37, the subject matter of any one of Examples 32 to 34 can optionally include further comprising selecting the optimum candidate from the plurality of candidate update operations.

In Example 38, the subject matter of any one of Examples 32 to 34 can optionally include further comprising selecting the optimum candidate update operation from the plurality of candidate update operations according to an orthogonality improvement metric of each of the plurality of candidate update operations.

In Example 39, the subject matter of Example 37 or 38 can optionally include further comprising: calculating the orthogonality improvement metric of each of the plurality of candidate update operations based on Seysen's orthogonality metric.

In Example 40, the subject matter of Example 37 or 38 can optionally include further comprising: calculating the orthogonality improvement metric of each of the plurality of candidate update operations based on an orthogonality evaluation expression that quantifies the orthogonality of the orthogonalized representation of the channel matrix.

In Example 41, the subject matter of Example 38 can optionally include wherein the orthogonality improvement metric of the optimum candidate update operation quantifies an improvement in orthogonality of the orthogonalized representation of the channel matrix according to the orthogonalization matrix.

In Example 42, the subject matter of any one of Examples 32 to 41 can optionally include further comprising: receiving a symbol vector on a channel, wherein the applying the orthogonalized representation of the channel matrix to perform symbol detection comprises: performing detection on the symbol detector with the orthogonalized representation of the channel matrix to obtain a recovered symbol vector.

In Example 43, the subject matter of any one of Examples 32 to 42 can optionally include wherein updating the orthogonalization matrix according to an optimum candidate update operation of the plurality of candidate update operations comprises: updating an updatee column of the orthogonalization matrix by adding a numerically scaled version of an updater column of the orthogonalization matrix to the updatee column.

In Example 44, the subject matter of Example 43 can optionally include wherein at least one of the updatee column or the updater column is a first column or a second column of the orthogonalization matrix previously utilized to update the orthogonalization matrix.

In Example 45, the subject matter of Example 44 can optionally include wherein the first column or the second column of the orthogonalization matrix were previously utilized to update the orthogonalization matrix by: updating the first column of the orthogonalization matrix by as the result of a linear combination of the first column of the orthogonalization matrix with a numerically scaled version of the second column of the orthogonalization matrix.

In Example 46, the subject matter of Example 44 can optionally include wherein the first column or the second column of the orthogonalization matrix were previously utilized to update the orthogonalization matrix in a first iteration of a matrix orthogonalization procedure; and wherein the identifying a plurality of candidate update operations for an orthogonalization matrix occurs in a second iteration of the matrix orthogonalization procedure immediately following the first iteration.

In Example 47, the subject matter of any one of Examples 32 to 46 can optionally include wherein applying the orthogonalization matrix to a channel matrix to obtain an orthogonalized representation of the channel matrix comprises: performing a matrix-by-matrix multiplication of the orthogonalization matrix and the channel matrix to obtain the orthogonalized representation of the channel matrix.

In Example 48, the subject matter of any one of Examples 32 to 47 can optionally include wherein the number of candidate update operations of the plurality of candidate update operations are linear with respect to the order of the symbol detection.

In Example 49, the subject matter of any one of Examples 32 to 48 can optionally include wherein the plurality of candidate update operations are a smaller subset of a finite number of possible candidate update operations for the orthogonalization matrix.

In Example 50, the subject matter of Example 49 can optionally include wherein the plurality of candidate operations only include candidate operations of the finite number of possible candidate update operations that comprise linearly combining at least one of the first column or the second column of the orthogonalization matrix.

In Example 51, the subject matter of Example 49 can optionally include wherein the finite number of possible candidate update operations for the orthogonalization matrix comprise a linear combination for each column of the orthogonalization matrix, and wherein the plurality of candidate update operations contain only candidate update operations that comprise a linear combination of at least one of a first column or a second column of the orthogonalization matrix previously utilized to update the orthogonalization matrix.

Example 52 is a receiver comprising symbol detection circuitry configured to perform the method of any one of Examples 32 to 51.

In Example 52, the subject matter of Example 52 can optionally include configured as a mobile terminal device or a base station.

Example 54 is a receiver comprising a memory and a processor configured to operate according to program code stored in the memory, the processor further configured to perform the method of any one of Examples 32 to 51.

Example 55 is an orthogonalization matrix calculation circuit comprising: a scaling coefficient calculation circuit configured to calculate a scaling coefficient for each of a plurality of candidate update operations for the orthogonalization matrix, wherein each of the plurality of candidate update operations comprises combining linearly at least one of a first column or a second column of the orthogonalization matrix previously utilized to update the orthogonalization matrix; an update operation selection circuit configured to select an optimum candidate update operation from the plurality of candidate update operations; and a matrix update circuit configured to update the orthogonalization matrix according to the scaling coefficient of the optimum candidate update operation.

In Example 56, the subject matter of Example 55 can optionally include wherein the orthogonalization matrix calculation circuit is configured to execute a plurality of iterations of a matrix orthogonalization procedure, wherein during each iteration the scaling coefficient calculation circuit is configured to calculate a scaling coefficient for each of an update plurality of candidate update operations for the orthogonalization matrix based on an optimum candidate operation from the immediately preceding iteration; and wherein during each iteration the matrix update circuit is configured to update the orthogonalization matrix according to an optimum candidate update operation selected from the updated plurality of candidate operations.

In Example 57, the subject matter of Example 56 can optionally include wherein during each iteration the update operation selection circuit is configured to select the optimum candidate update operation from the updated plurality of candidate update operations.

In Example 58, the subject matter of Example 56 or 57 can optionally include further comprising a matrix preprocessing circuit configured to execute an initiation stage of the matrix orthogonalization procedure, the matrix preprocessing circuit configured to: identify an initial plurality of candidate update operations for the orthogonalization matrix, wherein the initial plurality of candidate update operations collectively include candidate update operations that comprise a linear combination of each column of the orthogonalization matrix.

In Example 59, the subject matter of any one of Examples 55 to 58 can optionally include wherein the update operation selection circuit is further configured to: select the optimum candidate update operation from the plurality of candidate update operations based on which of the plurality of candidate update operations provides a maximum reduction in Seysen's metric.

In Example 60, the subject matter of any one of Examples 55 to 58 can optionally include wherein the selecting an optimum candidate update operation from the plurality of candidate update operations comprises: select the optimum candidate update operation from the plurality of candidate update operations based on which of the plurality of candidate update operations provides a maximum reduction in a Seysen's metric measurement of the orthogonalized representation of the channel matrix.

In Example 61, the subject matter of any one of Examples 55 to 58 can optionally include wherein the selecting an optimum candidate update operation from the plurality of candidate update operations comprises: selecting the optimum candidate update operation from the plurality of candidate update operations according to an orthogonality improvement metric of each of the plurality of candidate update operations.

In Example 62, the subject matter of any one of Examples 55 to 61 can optionally include further comprising: an orthogonalization metric calculation circuit configured to calculate an orthogonalization improvement metric for each of the plurality of candidate update operations.

In Example 63, the subject matter of Example 62 can optionally include wherein the calculating an orthogonalization improvement metric for each of the plurality of candidate update operations comprises: calculating the orthogonality improvement metric of each of the plurality of candidate update operations based on Seysen's orthogonality metric.

In Example 64, the subject matter of Example 62 can optionally include wherein the calculating an orthogonalization improvement metric for each of the plurality of candidate update operations comprises: calculating the orthogonality improvement metric of each of the plurality of candidate update operations based on an orthogonality evaluation expression that quantifies the orthogonality of a channel matrix.

In Example 65, the subject matter of Example 62 can optionally include wherein the orthogonality improvement metric of the optimum candidate update operation quantifies an improvement in orthogonality of the orthogonalized representation of the channel matrix caused by the orthogonality matrix.

In Example 66, the subject matter of Example 62 can optionally include wherein the orthogonality improvement metric of each respective candidate update operation of the plurality of candidate update operations quantifies an improvement in orthogonality of the orthogonalized representation of the channel matrix according to the orthogonalization matrix caused by the respective candidate update operation.

In Example 67, the subject matter of any one of Examples 55 to 66 can optionally include configured to provide the orthogonalization matrix to a detection circuit.

In Example 68, the subject matter of any one of Examples 55 to 57 can optionally include wherein the updating the orthogonalization matrix according to the scaling coefficient of the optimum candidate update operation comprises: updating an updatee column of the orthogonalization matrix by adding a numerically scaled version of an updater column of the orthogonalization matrix to the updatee column.

In Example 69, the subject matter of Example 68 can optionally include wherein at least one of the updatee column or the updater column is the first column of the orthogonalization matrix or the second column of the orthogonalization matrix.

In Example 70, the subject matter of Example 68 can optionally include wherein the matrix update circuit is configured to numerically scale the updater column according to the scaling coefficient to obtain the numerically scaled version of the updater column.

In Example 71, the subject matter of Example 68 can optionally include wherein the calculating a scaling coefficient for each of a plurality of candidate update operations for an orthogonalization matrix comprises: restricting the scaling coefficient of each of the plurality of candidate update operations to have at least one of a zero real part or a zero imaginary part.

In Example 72, the subject matter of Example 68 can optionally include wherein the calculating a scaling coefficient for each of a plurality of candidate update operations for an orthogonalization matrix comprises: restricting the domain of each of the scaling coefficients to have at least one of a zero real part or a zero imaginary part.

In Example 73, the subject matter of Example 71 or 72 can optionally include wherein the calculating a scaling coefficient for each of a plurality of candidate update operations for an orthogonalization matrix comprises: restricting each of the scaling coefficients to have a magnitude less than or equal to one.

In Example 74, the subject matter of any one of Examples 55 to 73 can optionally include wherein the first column or the second column of the orthogonalization matrix were previously utilized to update the orthogonalization matrix by: updating the first column of the orthogonalization matrix by as the result of a linear combination of the first column of the orthogonalization matrix with a numerically scaled version of the second column of the orthogonalization matrix.

In Example 75, the subject matter of any one of Examples 55 to 73 can optionally include wherein the first column or the second column of the orthogonalization matrix were previously utilized to update the orthogonalization matrix in a first iteration of a matrix orthogonalization procedure; and wherein the scaling coefficient calculation circuit is configured to calculate the scaling coefficient for each of the plurality of candidate update operations for the orthogonalization matrix a second iteration of the matrix orthogonalization procedure immediately following the first iteration.

In Example 76, the subject matter of any one of Examples 55 to 75 can optionally include wherein the number of candidate update operations of the plurality of candidate update operations are linear with respect to the order of the symbol detection.

In Example 77, the subject matter of any one of Examples 55 to 76 can optionally include wherein the plurality of candidate update operations are a smaller subset of a finite number of possible candidate update operations for the orthogonalization matrix.

In Example 78, the subject matter of Example 77 can optionally include wherein the finite number of possible candidate update operations for the orthogonalization matrix comprise a linear combination for each column of the orthogonalization matrix, and wherein the plurality of candidate update operations contain only candidate update operations that comprise a linear combination of at least one of a first column or a second column of the orthogonalization matrix previously utilized to update the orthogonalization matrix.

In Example 79, the subject matter of Example 55 can optionally include wherein each of the plurality of candidate update operations involve updating an updatee column of the orthogonalization matrix by adding a numerically scaled version of an updater column of the orthogonalization matrix to the updatee column, wherein at least one of the updatee column or the updater column is the first column of the orthogonalization matrix or the second column of the orthogonalization matrix.

Example 80 is a receiver comprising the orthogonalization matrix calculation circuit of any one of Examples 55 to 80, the symbol detection circuit configured to apply the orthogonalization matrix to a channel matrix to obtain an orthogonalized representation of the channel matrix and apply the orthogonalized representation of the channel matrix to perform symbol detection.

In Example 81, the subject matter of Example 80 can optionally include configured as a mobile terminal device or a base station.

In Example 82, the subject matter of Example 80 can optionally include configured as a MIMO receiver.

Example 83 is an orthogonalization matrix calculation circuit comprising: a scaling coefficient calculation circuit configured to calculate a scaling coefficient for each of a plurality of candidate update operations for an orthogonalization matrix, wherein each scaling coefficient is restricted to having at least one of a zero-valued real part or a zero-valued imaginary part; an update operation selection circuit configured to select an optimum candidate update operation from the plurality of candidate operations, wherein each candidate update operation of the plurality of candidate operations involves linearly combining a candidate updatee column of the orthogonalization matrix according to a numerically scaled candidate updater column of the orthogonalization matrix to update the candidate updatee column; and a matrix update circuit configured to update the orthogonalization matrix according to the scaling coefficient of the optimum candidate update operation.

In Example 84, the subject matter of Example 83 can optionally include wherein each scaling coefficient is further restricted to having a magnitude less than or equal to zero.

In Example 85, the subject matter of Example 83 or 84 can optionally include wherein the orthogonalization matrix calculation circuit is configured to execute a plurality of iterations of a matrix orthogonalization procedure, wherein during each iteration the scaling coefficient calculation circuit is configured to calculate a scaling coefficient for each of an update plurality of candidate update operations for the orthogonalization matrix, wherein each scaling coefficient is restricted to having at least one of a zero-valued real part or a zero-valued imaginary part; and wherein during each iteration the matrix update circuit is configured to update the orthogonalization matrix according the an optimum candidate update operation selected from the updated plurality of candidate operations.

In Example 86, the subject matter of Example 85 can optionally include wherein during each iteration the update operation selection circuit is configured to select the optimum candidate update operation from the updated plurality of candidate update operations.

In Example 87, the subject matter of Example 85 or 86 can optionally include further comprising a further comprising a matrix preprocessing circuit configured to execute an initiation stage of the matrix orthogonalization procedure, the matrix preprocessing circuit configured to: identify an initial plurality of candidate update operations for the orthogonalization matrix.

In Example 88, the subject matter of any one of Examples 83 to 87 can optionally include wherein the update operation selection circuit is further configured to: select the optimum candidate update operation from the plurality of candidate update operations based on which of the plurality of candidate update operations provides a maximum reduction in Seysen's metric.

In Example 89, the subject matter of any one of Examples 83 to 87 can optionally include wherein the selecting an optimum candidate update operation from the plurality of candidate update operations comprises: select the optimum candidate update operation from the plurality of candidate update operations based on which of the plurality of candidate update operations provides a maximum reduction in a Seysen's metric measurement of a channel matrix.

In Example 90, the subject matter of any one of Examples 83 to 87 can optionally include wherein the selecting an optimum candidate update operation from the plurality of candidate update operations comprises: selecting the optimum candidate update operation from the plurality of candidate update operations according to an orthogonality improvement metric of each of the plurality of candidate update operations.

In Example 91, the subject matter of Example 90 can optionally include further comprising: an orthogonalization metric calculation circuit configured to calculate the orthogonalization improvement metric for each of the plurality of candidate update operations.

In Example 92, the subject matter of Example 91 can optionally include wherein the calculating an orthogonalization improvement metric for each of the plurality of candidate update operations comprises: calculating the orthogonality improvement metric of each of the plurality of candidate update operations based on Seysen's orthogonality metric.

In Example 93, the subject matter of Example 91 can optionally include wherein the calculating an orthogonalization improvement metric for each of the plurality of candidate update operations comprises: calculating the orthogonality improvement metric of each of the plurality of candidate update operations based on an orthogonality evaluation expression that quantifies the orthogonality of a channel matrix.

In Example 94, the subject matter of Example 91 can optionally include wherein the orthogonality improvement metric of the optimum candidate update operation quantifies an improvement in orthogonality of the orthogonalized representation of the channel matrix according to the orthogonalization matrix.

In Example 95, the subject matter of any one of Examples 83 to 94 can optionally include configured to provide the orthogonalization matrix to a detection circuit.

In Example 96, the subject matter of any one of Examples 83 to 95 can optionally include wherein the updating the orthogonalization circuit according to the scaling coefficient of the optimum candidate update operation comprises: updating an updatee column of the orthogonalization matrix by adding a numerically scaled version of an updater column of the orthogonalization matrix to the updatee column, wherein the numerically scaled version of the updater column is numerically scaled according to the scaling coefficient of the optimum candidate update operation.

In Example 97, the subject matter of Example 96 can optionally include wherein at least one of the updatee column or the updater column is a first column or a second column of the orthogonalization matrix previously utilized to update the orthogonalization matrix.

In Example 98, the subject matter of Example 97 can optionally include wherein the matrix update circuit previously utilized the first column or the second column of the orthogonalization matrix to update the orthogonalization matrix by: updating the first column of the orthogonalization matrix by as the result of a linear combination of the first column of the orthogonalization matrix with a numerically scaled version of the second column of the orthogonalization matrix.

In Example 99, the subject matter of Example 97 can optionally include wherein matrix update circuit previously utilized the first column or the second column of the orthogonalization matrix to update the orthogonalization matrix in a first iteration of a matrix orthogonalization procedure; and wherein scaling coefficient calculation circuit is configured to calculate the scaling coefficient for each of the plurality of candidate update operations for the orthogonalization matrix in a second iteration of the matrix orthogonalization procedure immediately following the first iteration.

In Example 100, the subject matter of any one of Examples 83 to 99 can optionally include wherein the number of candidate update operations of the plurality of candidate update operations are linear with respect to the order of the symbol detection.

In Example 101, the subject matter of any one of Examples 83 to 100 can optionally include wherein the plurality of candidate update operations are a smaller subset of a finite number of possible candidate update operations for the orthogonalization matrix.

In Example 102, the subject matter of Example 101 can optionally include wherein the plurality of candidate operations only include candidate operations of the finite number of possible candidate update operations that comprise linearly combining at least one of the first column or the second column of the orthogonalization matrix.

In Example 103, the subject matter of Example 101 can optionally include wherein the finite number of possible candidate update operations for the orthogonalization matrix comprises a linear combination for each column of the orthogonalization matrix, and wherein the plurality of candidate update operations contain only candidate update operations that comprise a linear combination of at least one of a first column or a second column of the orthogonalization matrix previously utilized to update the orthogonalization matrix.

Example 104 is a receiver comprising the orthogonalization matrix calculation circuit of any one of Examples 83 to 103, the symbol detection circuit configured to apply the orthogonalization matrix to a channel matrix to obtain an orthogonalized representation of the channel matrix and apply the orthogonalized representation of the channel matrix to perform symbol detection.

In Example 105, the subject matter of Example 104 can optionally include configured as a mobile terminal device or a base station.

In Example 106, the subject matter of Example 104 can optionally include configured as a MIMO receiver.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A multiple-input multiple-output (MIMO) receiver comprising:
   a baseband processing circuit configured to perform symbol detection on a vector of received symbols, wherein the baseband processing circuitry includes an orthogonalization matrix calculation circuit, wherein the orthogonalization matrix calculation circuitry includes:
   a first matrix update circuit configured to, in a first iteration of a matrix orthogonalization procedure, update a first column of an orthogonalization matrix based on a second column of the orthogonalization matrix;
   a scaling coefficient calculation circuit configured to, in a second iteration of the matrix orthogonalization procedure, calculate a scaling coefficient for each of a plurality of candidate update operations for the orthogonalization matrix, wherein each of the plurality of candidate update operations comprises combining linearly the first column or the second column of the orthogonalization matrix with another column of the orthogonalization matrix;
   an update operation selection circuit configured to, in the second iteration, select an optimum candidate update operation from the plurality of candidate update operations; and
   a second matrix update circuit configured to, in the second iteration, update the orthogonalization matrix with the scaling coefficient of the optimum candidate update operation, wherein, after having performed the update of the orthogonalization matrix with the scaling coefficient of the optimum candidate update operation, the baseband processing circuitry is configured to perform said symbol detection on the vector of received symbols using the orthogonalization matrix.

2. The MIMO receiver of claim 1, wherein the orthogonalization matrix calculation circuit is configured to execute a plurality of iterations of the matrix orthogonalization procedure,
   wherein, during each of the plurality of iterations, the scaling coefficient calculation circuit is configured to calculate a scaling coefficient for each of an updated plurality of candidate update operations for the orthogonalization matrix based on an optimum candidate operation from the immediately preceding iteration; and
   wherein during each iteration the second matrix update circuit is configured to update the orthogonalization matrix with an optimum candidate update operation selected from the updated plurality of candidate operations.

3. The MIMO receiver of claim 1, wherein the update operation selection circuit is further configured to:
   select the optimum candidate update operation from the plurality of candidate update operations based on which of the plurality of candidate update operations provides a greatest reduction in Seysen's metric.

4. The MIMO receiver of claim 1, further comprising:
   an orthogonalization metric calculation circuit configured to, in the second iteration, calculate an orthogonalization improvement metric for each of the plurality of candidate update operations.

5. The MIMO receiver of claim 4, wherein the calculating an orthogonalization improvement metric for each of the plurality of candidate update operations comprises:
   calculating the orthogonalization improvement metric of each of the plurality of candidate update operations based on an orthogonality evaluation expression that quantifies the orthogonality of a channel matrix.

6. The MIMO receiver of claim 1, wherein the updating the orthogonalization matrix with the scaling coefficient of the optimum candidate update operation comprises:
   updating an updatee column of the orthogonalization matrix by adding a numerically scaled version of an updater column of the orthogonalization matrix to the updatee column.

7. The MIMO receiver of claim 6, wherein at least one of the updatee column or the updater column is the first column of the orthogonalization matrix or the second column of the orthogonalization matrix.

8. The MIMO receiver of claim 6, wherein the second matrix update circuit is configured to numerically scale the updater column with the scaling coefficient to obtain the numerically scaled version of the updater column.

9. The MIMO receiver of claim 6, wherein the calculating a scaling coefficient for each of a plurality of candidate update operations for an orthogonalization matrix comprises:
restricting the scaling coefficient of each of the plurality of candidate update operations to have at least one of a zero real part or a zero imaginary part.

10. The MIMO receiver of claim 1, wherein the second iteration of the matrix orthogonalization procedure immediately follows the first iteration.

11. A method for operating a multiple-input multiple-output (MIMO) receiver, the method comprising:
updating, in a first iteration of a matrix orthogonalization procedure, a first column of an orthogonalization matrix based on a second column of the orthogonalization matrix;
calculating, in a second iteration of the matrix orthogonalization procedure, a scaling coefficient for each of a plurality of candidate update operations for the orthogonalization matrix, wherein each of the plurality of candidate update operations comprises combining linearly the first column or the second column of the orthogonalization matrix with another column of the orthogonalization matrix;
selecting, in the second iteration, an optimum candidate update operation from the plurality of candidate update operations; and
updating, in the second operation, the orthogonalization matrix with the scaling coefficient of the optimum candidate update operation;
after updating the orthogonalization matrix with the scaling coefficient of the optimum candidate update operation, performing symbol detection on a vector of received symbols using the orthogonalization matrix.

12. The method of claim 11, further comprising executing a plurality of iterations of the matrix orthogonalization procedure, wherein each of the plurality of iterations comprises:
calculating a scaling coefficient for each of an updated plurality of candidate update operations for the orthogonalization matrix based on an optimum candidate operation from the immediately preceding operation; and
updating the orthogonalization matrix with an optimum candidate operation selected from the updated plurality of candidate operations.

13. The method of claim 11, further comprising:
selecting the optimum candidate update operation from the plurality of candidate update operations based on which of the plurality of candidate update operations provides a greatest reduction in Seysen's metric.

14. The method of claim 11, further comprising:
calculating, in the second iteration, an orthogonalization improvement metric for each of the plurality of candidate update operations.

15. The method of claim 14, wherein calculating the orthogonalization improvement metric for each of the plurality of candidate update operations comprises:
calculating the orthogonalization improvement metric of each of the plurality of candidate update operations based on an orthogonality evaluation expression that quantifies the orthogonality of a channel matrix.

16. The method of claim 11, wherein updating the orthogonalization matrix with the scaling coefficient of the optimum candidate update operation comprises:
updating an updatee column of the orthogonalization matrix by adding a numerically scaled version of an updater column of the orthogonalization matrix to the updatee column.

17. The method of claim 16, wherein at least one of the updatee column or the updater column is the first column of the orthogonalization matrix or the second column of the orthogonalization matrix.

18. The method of claim 16, wherein updating the orthogonalization matrix with the scaling coefficient of the optimum candidate update operation further comprises:
numerically scaling the updater column with the scaling coefficient to obtain the numerically scaled version of the updater column.

19. The method of claim 16, wherein calculating the scaling coefficient for each of a plurality of candidate update operations for an orthogonalization matrix comprises:
restricting the scaling coefficient of each of the plurality of candidate update operations to have at least one of a zero real part or a zero imaginary part.

20. The method of claim 11, wherein the second iteration of the matrix orthogonalization procedure immediately follows the first iteration.

21. The method of claim 11, wherein the number of candidate update operations of the plurality of candidate update operations are linear with respect to the order of the symbol detection.

22. The MIMO receiver of claim 4, wherein the update operation selection circuit is configured to select the optimum candidate update operation based on the orthogonalization improvement metrics for each of the plurality of candidate update operations.

23. The method of claim 11, wherein selecting the optimum candidate update operation from the plurality of candidate update operations comprises selecting the optimum candidate update operation based on the orthogonalization improvement metrics for each of the plurality of candidate update operations.

* * * * *